United States Patent
Kiyota et al.

(10) Patent No.: US 7,437,519 B2
(45) Date of Patent: Oct. 14, 2008

(54) MULTITHREAD CONTROLLER AND CONTROL METHOD

(75) Inventors: Naohiro Kiyota, Yokohama (JP); Iwao Yamazaki, Atami (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 11/283,832

(22) Filed: Nov. 22, 2005

(65) Prior Publication Data

US 2006/0161735 A1 Jul. 20, 2006

(30) Foreign Application Priority Data

Nov. 29, 2004 (JP) ............................. 2004-344405

(51) Int. Cl.
*G06F 12/14* (2006.01)

(52) U.S. Cl. ...................................... 711/141
(58) Field of Classification Search ................. 711/141, 711/150
See application file for complete search history.

(56) References Cited

U.S. PATENT DOCUMENTS

| | | | |
|---|---|---|---|
| 5,535,361 A | 7/1996 | Hirata et al. | |
| 5,546,593 A | 8/1996 | Kimura et al. | |
| 6,493,741 B1 | 12/2002 | Emer et al. | |
| 6,651,163 B1 | 11/2003 | Kranich et al. | |
| 6,674,192 B2 | 1/2004 | Morikaku et al. | |
| 2005/0027963 A1* | 2/2005 | Hum et al. | 711/210 |
| 2005/0160228 A1* | 7/2005 | Teruyama | 711/133 |

FOREIGN PATENT DOCUMENTS

| | | |
|---|---|---|
| JP | 61-229150 | 10/1986 |
| JP | 03-164964 | 7/1991 |
| JP | 06-44089 | 2/1994 |
| JP | 2002-41489 | 2/2002 |
| JP | 2002-163121 | 6/2002 |

OTHER PUBLICATIONS

Extended European Search Report, mailed Apr. 4, 2008 and issued in corresponding European Patent Application No. 05257295.5-2211.

* cited by examiner

*Primary Examiner*—Kevin Ellis
(74) *Attorney, Agent, or Firm*—Staas & Halsey LLP

(57) ABSTRACT

A multithread control apparatus and control method to switch a plurality of threads in a multithread processor, which includes a plurality of thread processors to execute the plurality of threads, by executing a synchronization lock control by considering release of exclusive access right to a relevant thread processor when a particular block in caches is updated with another processor or another thread processor during execution of a certain thread processor.

21 Claims, 19 Drawing Sheets

SMT (SIMULTANEOUS MULTI-THREADING) ──────────────→ TIME

| A | A | A | A | B | A |
|---|---|---|---|---|---|
| A | B | A | B | B | A |
| B | B | A | B | A | A |
| B | A | B | B | A | B |

FIG. 1

MULTITHREAD CONTROLLER AND CONTROL METHOD

CROSS-REFERENCE TO RELATED APPLICATIONS

This application claims the benefit of Japanese Application No. 2004-344405, filed Nov. 29, 2004, in the Japan Patent Office, the disclosure of which is incorporated herein by reference.

BACKGROUND OF THE INVENTION

1. Field of the Invention

The present invention relates to a multithread controller and a control method for effectively switching a plurality of threads in a multithread processor for executing a plurality of threads.

2. Description of the Related Art

In recent years, as the typical computer architectures, the RISC (Reduced Instruction Set Computer) architecture having simplified the processes executable in one instruction and the VLIW (Very Long Instruction Word) architecture having summarized a plurality of instructions which can be executed simultaneously into one longer instruction with software, are known in addition to the CISC (Complex Instruction Set Computer) architecture for executing complicated processes with one instruction.

Moreover, the processing methods in a central processing unit (CPU) of a computer to reach these architectures may be roughly classified into two methods of an in-order execution type method and an out-of-order execution type method. The in-order type method is capable of sequentially processing the instruction stream along the program sequence, while the out-of-order type method is capable executing the process by passing over the preceding instruction without relation to the program sequence when the instructions are not in the relationship of mutual dependence.

In these years, attention is paid to a multithread processor system to physically execute in parallel a plurality of threads in a processor which is physically composed of one device in addition to the single thread process to execute one program (thread) in one processor.

In general, a CPU also has the resources, in addition to a register and a status register (CPU status register), which can be observed from software for executing addition, subtraction, multiplication and division and a loading process to read the memory data to a register and a storing process to write data of a register into a memory.

A multithread processor has a plurality of resources to execute a plurality of instructions with a plurality of programs while executing, only in one CPU, individual programs by multiplexing the registers which may be observed with software.

As a system for realizing the multithread process as described above, there are coarse grained multithreading system and vertical multithreading (VMT: time division type multithreading) system (refer to FIG. 2) in which a plurality of threads are not executed simultaneously and the thread is switched to the other thread for execution when an event such as cache miss occurs, in addition to the fine grained multithreading system and simultaneous multithreading (SMT) (refer to FIG. 1) for simultaneously executing a plurality of threads (refer to Japanese publication JP-A No. 2002-163121).

FIG. 1 is a diagram for explaining the SMT system, while FIG. 2 is a diagram for explaining the VMT system.

The VMT system is intended to hide the instruction processes in which a cache miss that takes a longer time to process is generated. When the cache miss is detected, while the process to bring the data from the memory to the cache is executed in the cache control unit (not illustrated), the thread is switched for execution to the other thread for a process other than a memory access in the executing unit and the control unit (not illustrated). In this VMT system, the thread is switched to the other thread when a constant time has passed for the thread in which a cache miss is not easily generated.

FIG. 3 is a diagram for explaining the process when a cache miss is generated in the in-order method. FIG. 4 is a diagram for explaining the process when a cache miss occurs in the out-of-order method. FIG. 5 is a diagram for explaining the thread switching method of the related art in the out-of-order method. In the related art, the VMT method is installed only on the in-order type processor described above.

In the processor for in-order execution, an event such as cache miss occurs in the program sequence and the data generating a cache miss is also responded from the memory in the program sequence (refer to FIG. 3). Meanwhile, in the processor for out-of-order execution, memory access does not occur in the instruction sequence in the program and an event of cache miss is not always generated in the program sequence.

For example, if two instructions A, B exist on the thread X wherein cache miss is generated and the sequence of the instructions A and B is determined in this sequence on the thread X as illustrated in FIG. 5, when it is possible to execute the instruction B before the instruction A, cache miss by the instruction B is detected before detection of the cache miss by the instruction A.

For example, in the example of FIG. 5, when cache miss by the instruction B is detected and the thread X is switched to the other thread Y before detection of cache miss by the instruction A, cache miss by instruction A is generated after execution of the thread X is restarted.

In the in-order execution type processor, execution of the instruction B is started after the start of execution of the instruction A. Accordingly, the cache miss is generated in the sequence of the instructions A and B.

Moreover, in a shared memory system by a multiprocessor, it is known to use the method for locking mutex-lock (Mutual Exclusion lock) in order to attain the exclusive access right. As a typical method for attaining the lock, a spin-loop method has been proposed. In this method, the exclusive access right is obtained among a plurality of processors by providing a "lock variable" on the main memory, repeating, by individual processor, the reference/update trial of the "lock variable" for attaining the lock and the spin loop (waiting for idle state), displaying only the lock state only during the lock period when the lock has been attained and displaying cancellation of lock state when it is requested to cancel the lock state.

However, a check is always required even in this structure by searching the loop, but the processing rate of processors can be more and more improved in these years exceeding the processing rate of the memory system and the relative processing rate tends to be more alienated.

In this state, even when the number of times of idle state by the spin loop is increased, the spin loop instruction stream is interpreted and executed during this period, but any job is not substantially carried out, resulting in the problem of influence applied on the system performance. Particularly, in a large scale Symmetrical Multiprocessor (SMP) system, it is often detected that only a certain lock variable is used frequently. In this case, other CPUs except for only one CPU are working uselessly and therefore the performance cost required by the system operation is left as a problem to be solved.

Moreover, in the processor core having employed the multithread processing system, if the spin loop is generated in a certain thread processing portion, idle operation by the spin loop process in which any job is not executed substantially gives an adverse effect which impedes progress of the other thread process of the processor core.

Similar problem is also generated in the other process using the lock variable, for example, an ordinary processor-to-processor synchronization such as the processor-to-processor synchronization like the barrier synchronization, I/O synchronization and idle loop.

The Japanese publications JP-A No. 1991-164964, JP-A No. 1986-229150, and JP-A No. 2002-41489 are known as the exclusive access control and synchronization control technology of the related art in the multiprocessor system.

The JP-A No. 1991-164964 discloses a mechanism to realize the exclusive access control with centralized monitoring on the main memory by storing a common variable on the relevant main memory. In the processor having the cache memory in recent years, modification in the cache is not immediately reflected on the main memory. Particularly in the write back cache memory, considerably longer time is usually required until the modification is reflected. Moreover, even in the write through cache, memory latency is very longer and reflection loss becomes longer, deteriorating the performance in the current processors.

Accordingly, various spin loop problems described above cannot be solved only by the centralized supervising of the main memory as disclosed in the JP-A No. 1991-164964, and a method is now desired to solve the problems within the cache memory not influenced by the memory latency.

The JP-A No. 1986-229150 discloses the technology to realize exclusive control for the common memory among the CPUs by providing access control signal lines (pins) for exclusive control among the CPUs in addition to the system bus which is shared by a plurality of CPUs. In recent years, higher cost is required for connections among processors (for example, the number of input/output pins of an LSI) and it is more effective for improvement in the performance to use one pin as the data line than use of the same only as for exclusive access control. Otherwise, much contribution can be attained to reduction in manufacturing cost of the CPU by saving the number of pins even if only one pin is saved. Accordingly, it is desired to provide a method of realizing exclusive access control among CPUs without increase in the number of pins.

The JP-A No. 2002-41489 discloses a synchronization control circuit for synchronous control between the processor and the coprocessor which are in the master-and-slave relationship. However, application of this circuit into the system like an SMP (symmetrical multiprocessor) and a cc-NUMA (Cache-Coherent Non-Uniform Memory Access) in which individual processors equally use the common memory is difficult.

Namely, since the processor is in the standpoint to issue instructions to the coprocessor, it can detect the operating conditions of the coprocessor when it hopes. However, in the SMP system, since individual processor does not hold, in principle, the information of the operating conditions of the other processors, it is difficult to apply the technology of the JP-A No. 2002-41489 into the problem in the spin loop described above.

Moreover, in view of solving the problem of spin loop, the method for starting execution has been proposed in which when a particular event which shows spin loop to wait for release is detected, a processor or a thread which is considered as the factor thereof is stopped, the context of the thread in the stop state is saved to the memory, and a new context is stored from the memory (refer to the Japanese publication JP-A No. 1994-44089). However, in the JP-A No. 1994-44089, since the particular event which shows the spin loop is generated by miss-hit during access to the cache, the total performance is likely deteriorated because more useless thread switching and saving of context than the effect of improvement in the performance resulting from reduction in the spin loop time are generated.

Accordingly, in view of solving the problem of spin loop, the method to solve the same problem has been proposed as a background art in which possibility of update event of the lock variable for exclusive access control of memory access is forecasted and the process or thread is stopped at the part which will result in the spin loop. In other words, in view of realizing forecast of the possibility of the update event of lock variable, a new load instruction having the function to set the timing to start the supervising of the memory block in the range including the load object memory block (hereinafter referred to as LOAD-WITH-LOOKUP (LLKUP) instruction) and a write event detecting function for supervising the memory block are provided, and stop and restart of the processor are realized by executing and canceling a pause instruction of the SUSPEND instruction or the like in conjunction with the detection result of the LOAD-WITH-LOOKUP instruction and the write event detecting function.

Namely, FIG. 6A is a diagram for explaining a method of canceling a lock in the background art. As illustrated in FIG. 6A, for acquisition of lock of the lock variable [A] on the memory device, a useless spin loop has been executed to verify change in the lock variable [A] (release from the other processor) by repeating LD[A] after the failure in acquisition by CAS[A].

FIGS. 6B and 7-9, are diagrams for explaining four technologies using a LOAD-WITH-LOOKUP instruction. In contrast to FIG. 6A, in FIG. 6B, technology (1) uses a LOAD-WITH-LOOKUP instruction 601 (see also LLKUP instructions 701, 801, 901 with respect to other LLKUP technologies), in which a CPU1 issues the LOAD-WITH-LOOKUP instruction 601 after the failure of acquisition by the CAS[A] and supervises the store event to the lock variable [A] (possibility of release from the other CPU2). The store event to the lock variable [A] is performed via a store instruction 603 (see also store instructions 703, 803, 903 with respect to other LLKUP technologies). Moreover, the CPU1 also shifts to the pause state with the SUSPEND instruction 602 (see also SUSPEND instructions 702, 802, 902 with respect to other LLKUP technologies). Here, the CPU1 is reset in the timing of the detection of possibility of store event for the lock variable [A] from the other CPU2 in order to try the reacquisition of the lock variable [A]. Accordingly, it is no longer required to execute the useless spin loop.

Namely, in general, as illustrated in FIG. 7 for explaining LOAD-WITH-LOOKUP instruction technology (2), the CPU1 starts supervising the target lock variable [A] with the LOAD-WITH-LOOKUP instruction and thereafter shifts to the SUSPEND (pause state). Upon detection of the access for releasing the lock variable [A] from the other CPU2, the CPU1 is reset from the pause state and starts the subsequent execution of the instruction.

Moreover, in the technology to use the LOAD-WITH-LOOKUP instruction, forecasting of the portion which shows the spin loop and stop/restart of the processor are realized by analyzing the instruction stream of the existing programs. In other words, the step for finding out the instruction stream which becomes the spin loop to find the possibility of update event of the lock variable from the existing instruction stream and the step to stop the relevant processor or the relevant hardware thread in place of the conventional spin loop are executed.

However, the processors in recent years naturally form the cache and supervising of the main memory device is always accompanied by considerable difficulty. Therefore, the technology using the LOAD-WITH-LOOKUP instruction is provided with the write event detecting function for supervising and detecting possibility of the update event of lock variable within the cache memory.

Namely, as illustrated in FIG. 8, as a method of finding out the possibility of the update event of the lock variable [A], the CPU1 side is reset from the pause state in the timing for detecting invalidation on the cache memory of the lock variable [A] from the side of CPU2 in the lock state.

Here, there lies a possibility, as illustrated in FIG. 9, that invalidation (release) on the cache memory of the lock variable [A] is detected during the period until the shift to the pause state from the LOAD-WITH-LOOKUP instruction. In this case, access to the lock variable [A] is continued in direct without shift to the pause state.

The higher the detection accuracy in the possibility of update of the lock variable is, the higher the application efficiency of the process becomes. Moreover, the constitution is provided to avoid the situation that the update cannot be detected even if the update is actually generated in order to prevent that unreasonable hang-up.

Moreover, it is naturally required sometimes to use the suspend method which allows only the restart with only the existing interruption without supervising the address. Accordingly, it is convenient to provide the constitution to enable selection of the suspend instruction when it is used.

However, in certain cases, an additional instruction cannot be generated/added to an existing instruction set or a program cannot be revised (or is difficult to revise) from the old instruction code. In this case, addition of the instruction cannot result in any merit. Therefore, it is desired to propose a method of resulting in the merit and solving such problem without addition of instructions.

Otherwise, for the actual improvement, it can be said more desirable to add the LOAD-WITH-LOOKUP instruction and to clearly give the instruction using the added instruction. Namely, the method for adding the LOAD-WITH-LOOKUP instruction and the method for analyzing the existing instruction stream can be clearly improved with the existing method but it is the best method to combine these methods.

For the installing of this LOAD-WITH-LOOKUP instruction, it is required to supervise whether the memory address of the main memory device designated with the LOAD-WITH-LOOKUP instruction has been updated or not with the other thread or the other processor and therefore the following installing method has been proposed as the related art.

As a first installing method, a method is considered (refer to the U.S. Pat. No. 6,493,741 and the U.S. Pat. No. 6,674, 192), in which all bits of the physical address of the cache line as the object of supervising are held in a supervising object management register as the exclusive register and presence of the access to the physical address as the object of supervising is detected with comparison of the physical addresses.

In this case, it is necessary to hold, to a supervising object management register, the information including a physical address of the supervising object, a bit indicating the supervising process, and a thread number of the supervising object. For example, when the WRITE access is generated to the cache memory or to the main memory from the other thread and the physical address is matched with that of the supervising object, update of the address of the supervising object is detected. Moreover, when the cache line including the address of the supervising object is lost by the replace of the cache memory, purge request from the other processor (discharge request) or by the invalidation request, it is reported that the address of the supervising object has been updated because of the possibility that the address of the supervising object may be updated with the other processor.

Next, as the second installing/loading method, a method is considered in which presence of access to the memory location as the supervising object is detected by storing the bit indicating the supervising object in a cache tag and supervising update and reference to the cache line to which the bit indicating the supervising object is set.

In this case, it is required to add, as an entry of cache tag, the bit indicating the supervising object and the thread number of the supervising object. For example, it is reported that the address of supervising object has been updated with the bit indicating the supervising object and the bit indicating the thread number of the supervising object registered to the cache tag at the time of processing the WRITE access request to the cache memory or main memory, or invalidation or purge request of the cache line by the replacement, and invalidation and purge request of the cache line by the request from the other processors.

FIG. 16 illustrates a structure of an address comparator of the related art, corresponding to the first installing/loading method. The line address stored in an address supervising register 1601 is compared with the line address stored in an update access address register 1602 for storing the update access address at the time of cache access. The Ex-NOR logic gates 1611 to 1518 output negation of exclusive OR of the address bits and output logical AND with an AND gate 1619 in order to detect matching of the line addresses. In the method of the related art, the physical addresses (41 bits of bit [46:6] in FIG. 16) have to be compared completely. Accordingly, the logic circuit is increased from the physical point of view.

FIG. 17 illustrates a method of storing the supervising addresses in a cache tag of the related art, corresponding to the second installing/loading method. A tag RAM 1701 includes a plurality of entries and each entry is formed of a valid flag 1702, cache status 1703, a supervising flag 1704, and a physical address 1705. In the method of the related art, the RAM is increased physically because all entries of the relevant tag RAM is required to provide a valid flag and a supervising flag.

FIG. 18 illustrates an example of the hardware structure for update control of the supervising object block, corresponding to the second installing/loading method. A read/write control unit 1811 judges whether the relevant cache access is the READ access or WRITE access when the cache access is generated and controls the select signal of multiplexers 1812 and 1813. For example, when the relevant cache access is the READ access, the read/write control unit 1811 controls the select signal to control the multiplexers 1812 and 1813 to output the READ address 1801. While when the relevant cache access is the WRITE access, it controls the select signal to control the multiplexers 1812 and 1813 to output the WRITE address 1802.

The tag RAM 1815 for WAY 0 and the tag RAM 1816 for WAY 1 are RAMs provided with the write enable (WE) terminal and the WE terminal(s) executes the write operation for the RAM when 1 is input to the relevant write enable.

A cache LRU control RAM 1817 might correspond to a cache LRU control RAM 1112 of FIG. 11. In the related art, the cache LRU control RAM 1817 is used for control of cache LRU (Least Recently Used) for the cache 1815, 1816 and outputs the replace WAY-ID 1803 based on the LRU information. An inverter logic gate 1814 is a logical gate for outputting negation of input.

In this related art, when the read access 1801 is generated as the cache access, the read/write control unit 1811 selectively controls the multiplexers 1812 and 1813, searches the relevant line address of the tag RAM 1815 for WAY 0 and the tag RAM 1816 for WAY 1, and also searches the cache LRU control RAM 1817. When a cache miss is generated in the searches of the tag RAM 1815 for WAY 0 and tag RAM 1816 for WAY 1, cache is registered with the replacement of the relevant line address of the rag RAMs for WAY 0 and WAY 1 in accordance with the replace WAY-ID 1803 on the basis of the LRU information of the cache LRU control RAM 1817.

Accordingly, when the line address is identical to the line address of the supervising object block and the WAY-ID of the tag RAM registered is identical, useless thread switching can be generated because the relevant supervising object block could be replaced.

In the first installing method of the related art, all physical addresses are stored in the supervising object management register for each thread and thereby the supervising object management register physically becomes large. As the trend in future, a high-end server which is required to have higher processing capability for the principal job processes in the company tends to cover high-level multithreading by a large scale CMP (Chip Multi-Processor). Therefore, it may be said that the system to obtain the supervising object by simply storing all physical addresses as many as the number of threads has insufficient expandability to high-level multi-thread processor in future.

In addition, in the second instruction installing method in the related art, it is required to add the entry for the supervising process to all cache lines of the cache tag, but the cache line as the supervising object has higher possibility that the cache line itself is purged at the time of the cache replacement thereof, resulting in the problem that unwanted thread switching is generated because update of the address of the supervising object is reported carelessly.

Therefore, the first and second installing/loading methods in the related art listed above can be said to be within the scope of the related art because these do no disclose any effective method for supervising the addresses in regard to the method of switching a plurality of threads.

SUMMARY OF THE INVENTION

The present invention provides a control apparatus and a control method for effectively switching, in the multithread processor which can execute the multithreads, a plurality of threads without any increase in the chip size and power consumption due to the increment of logical amount and physical amount by using the cache line address used for index of cache line and the WAY-ID registered on the cache without supervising the physical addresses.

Additional aspects and advantages of the invention will be set forth in part in the description which follows and, in part, will be obvious from the description, or may be learned by practice of the invention.

The present invention provides a processor comprising a cache memory having WAY formed of at least two or more divided storing regions and at least one or more thread processing means, characterized in comprising a supervising address storing means which is provided for each thread processing means to hold WAY number and line address to designate a particular block, and a comparing means which is provided for each thread processing means to compare the WAY number and line address of a cache memory held by a supervising address storing means with the WAY number and line address of a cache memory accessed from the other thread processing means, in order to execute the exclusive access control of the thread processing means on the basis of an output from the comparing means.

Moreover, the present invention provides an information processor including a processor comprising a cache memory having WAY formed of at least two or more divided storing regions and at least one or more thread processing means, characterized in comprising a supervising address storing means which is provided for each thread processing means to hold WAY number and line address to designate a particular block, and a comparing means which is provided for each thread processing means to compare WAY number and line address of a cache memory held by a supervising address storing means with WAY number and line address of a cache memory accessed from the other thread processing means, in order to execute the exclusive control of the thread processing means on the basis of an output of the comparing means.

Moreover, the present invention provides the processor, characterized in resetting the supervising address storing means when update of the particular block is detected.

Moreover, the present invention provides a processor comprising a cache memory having WAY formed of at least two or more divided storing regions and at least one or more thread processing means, characterized in comprising a supervising address storing means which is provided for each thread processing means to hold WAY number and line address for designating a particular block, and a comparing means which is provided for each thread processing means to compare WAY number and line address of a cache memory held by a supervising address storing means with WAY number and line address of a cache access from the other thread processing means, in order to register, when a cache miss for the cache memory means is generated, the block to be replaced with the particular block due to generation of cache miss to the WAY having the number different from the WAY held by the supervising address storing means.

Moreover, the present invention provides an information processor comprising a processor including a cache memory having WAY formed of at least two or more divided storing regions and at least one or more thread processing means, characterized in comprising a supervising address storing means which is provided for each thread processing means to hold WAY number and line address for designating a particular block, a comparing means which is provided for each thread processing means to compare WAY number and line address of a cache memory held by a supervising address storing means with WAY number of line address of a cache memory access from the other thread processing means, in order to register, when a cache miss for the cache memory means is generated, the block to be replaced with the particular block due to generation of cache miss to the WAY having the number different from that of the WAY held by the supervising address storing means.

Moreover, the present invention provides the cache memory, characterized in that a cache memory can be degenerated up to one WAY and when the cache memory is degenerated to one WAY, the block to be replaced with the particular block is forcibly registered to the WAY of the degenerated cache memory.

Moreover, the present invention provides a method of controlling a cache memory in a processor comprising a cache memory including WAY formed of at least two or more divided storing regions and at least one or more thread processing unit comprising a supervising address storing unit which is provided for each thread processing unit to hold WAY number and line address for designating a particular block, and a comparing unit which is provided for each thread processing unit to compare WAY number of line address of a cache memory held by a supervising address storing unit with WAY number and line address of a cache memory access from the other thread processing unit, characterized in that when access to the cache memory unit is generated, the line address and WAY number are held to the supervising address storing unit after completion of access, when a write request is issued by the other processor or the other thread processing unit, the line address and WAY number held in the supervising address storing unit are compared with that of the relevant access to the cache, and when the line address and WAY number are matched, update of the particular block is detected.

Moreover, the present invention provides the processor characterized in that when update of the particular block is detected, the processor resets the supervising address storing unit.

Moreover, the present invention provides a method of controlling a cache memory in a processor comprising a cache memory having WAY formed of at least two or more divided storage regions and at least one or more thread processing units comprising a supervising address storing unit which is provided for each thread processing unit to hold WAY number of line address for designating a particular block and a comparing unit which is provided for each thread processing unit to compare WAY number of line address of a cache memory held by a supervising address storing unit with WAY number and line address of a cache memory accessed from the other thread processing unit, characterized in that when a cache miss for the cache memory is generated, the block to be replaced with the particular block due to generation of the cache miss is registered to the WAY having the number different from the WAY number held by the supervising address storing unit.

Moreover, the present invention provides the method of controlling the cache memory characterized in that the cache memory can be degenerated to one WAY and when the cache memory is degenerated to one WAY, the block to be replaced with the particular block due to generation of cache miss is forcibly registered to the WAY of the degenerated cache memory.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a diagram for explaining the SMT system.

DETAILED DESCRIPTION OF THE PREFERRED EMBODIMENTS

Figure 2:
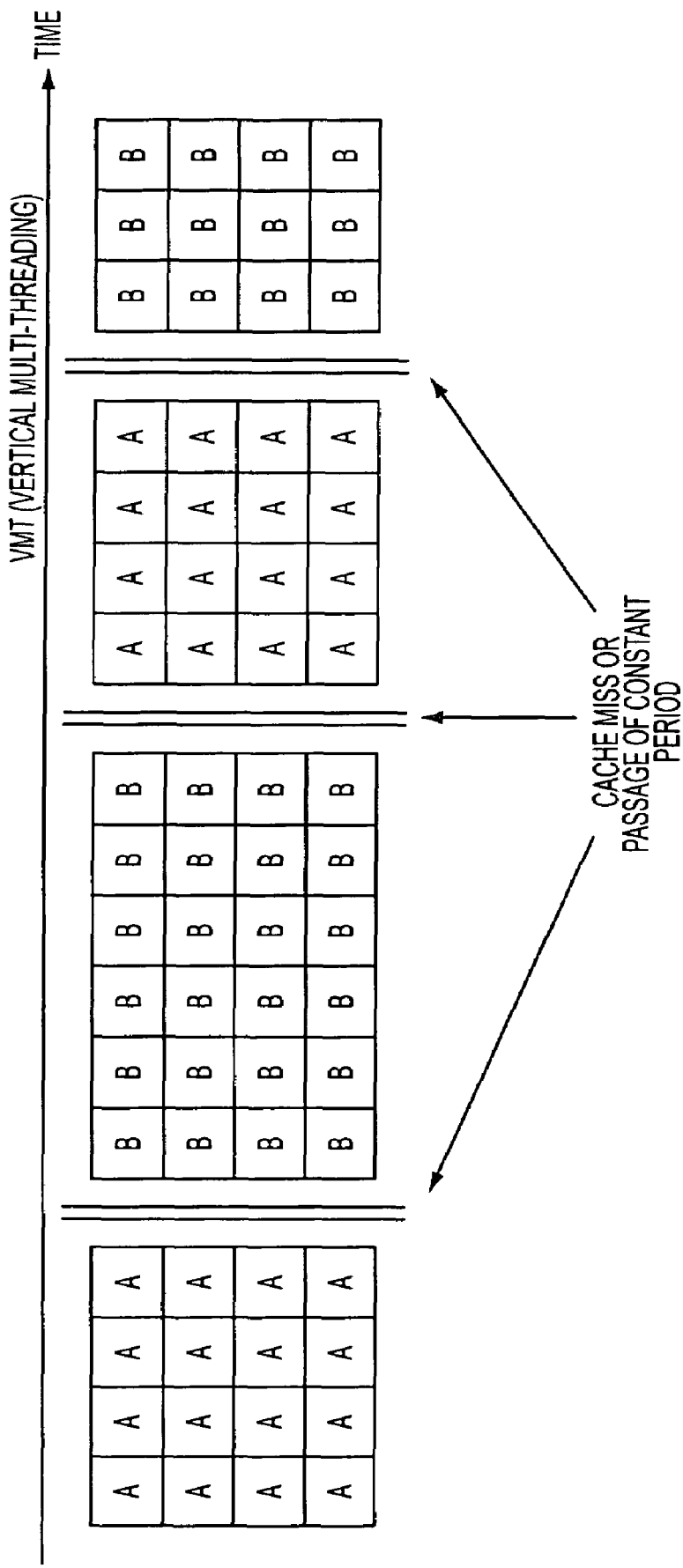
FIG. 2 is a diagram for explaining the VMT system.
Figure 3:
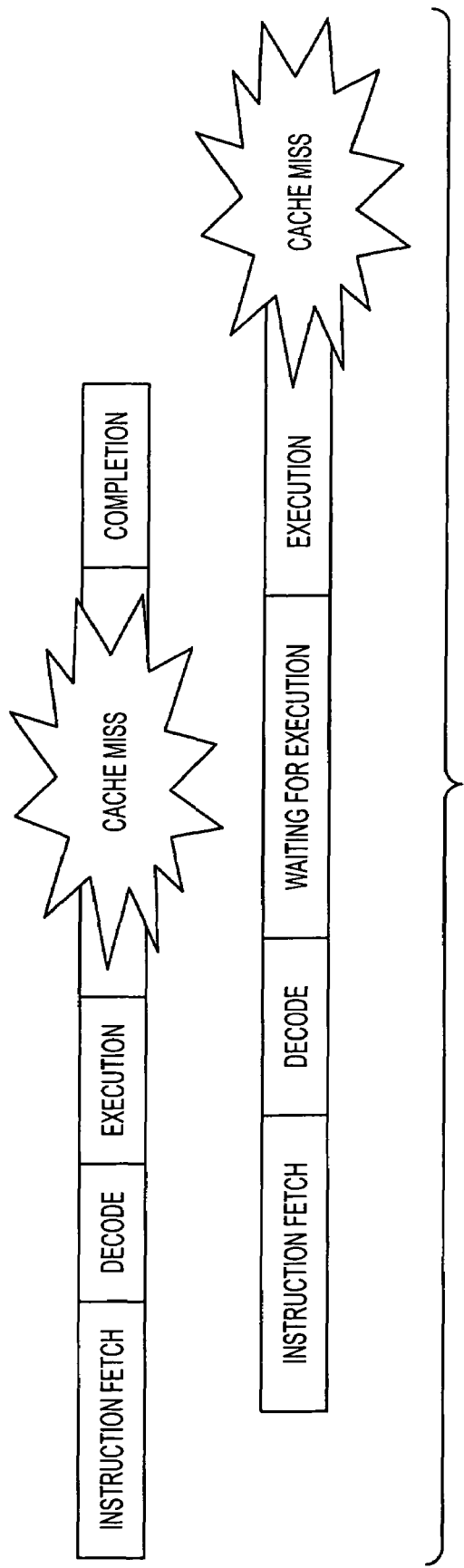
FIG. 3 is a diagram for explaining the process when a cache miss is generated in the in-order system.
Figure 4:
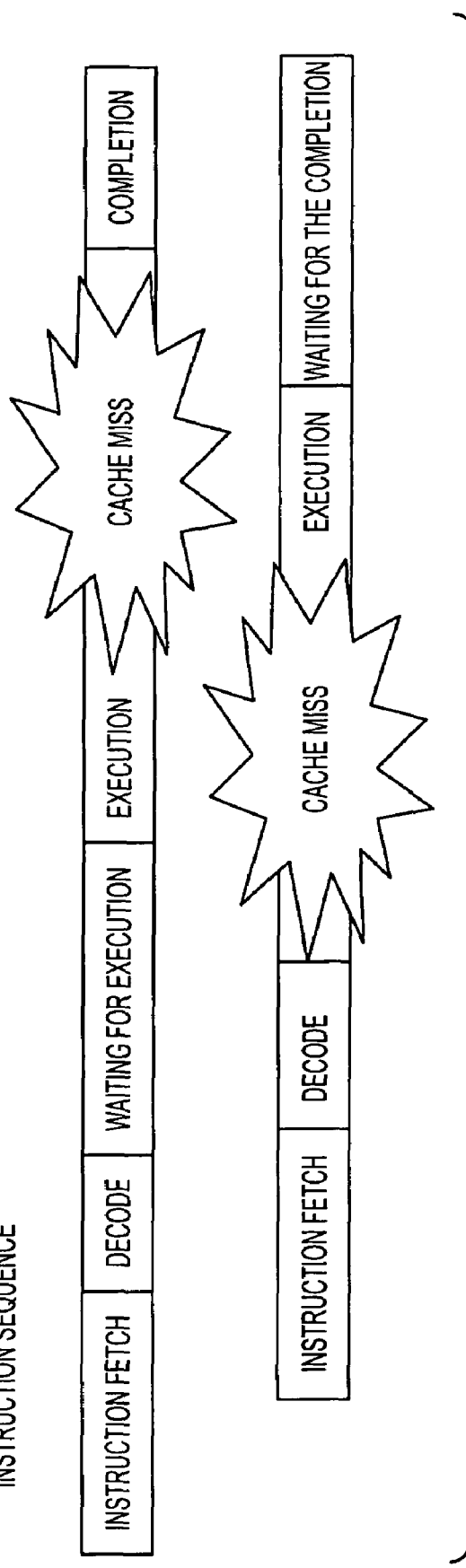
FIG. 4 is a diagram for explaining the process when a cache miss is generated in the out-of-order system.
Figure 5:
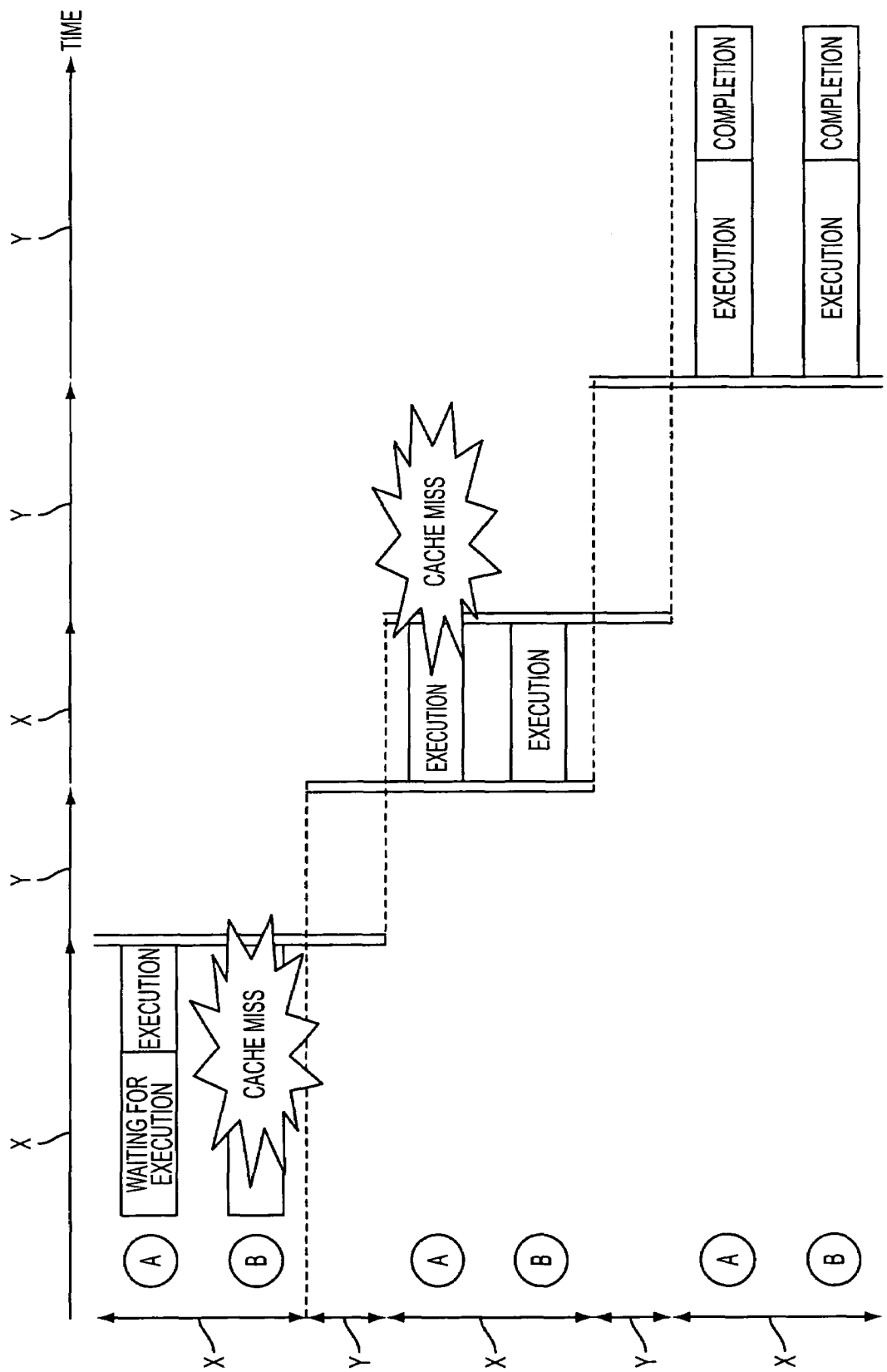
FIG. 5 is a diagram for explaining the thread switching method in the out-of-order system.
Figure 6A:
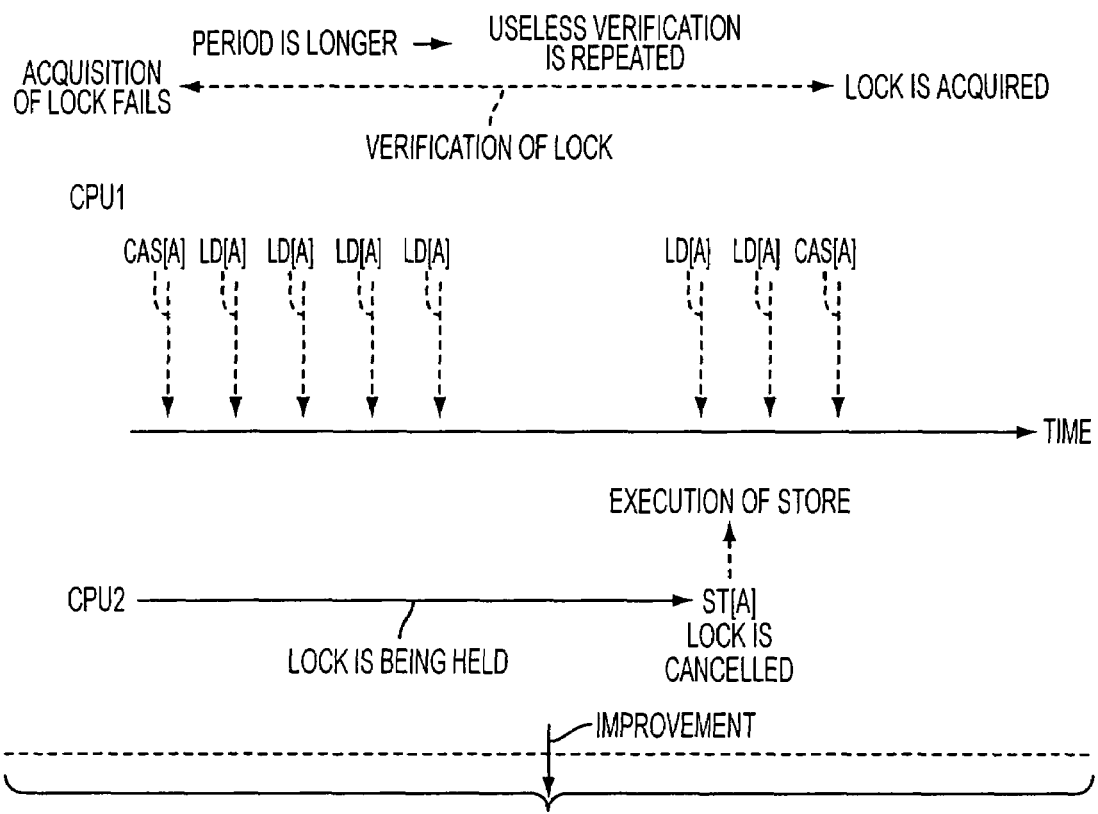
FIG. 6A is a diagram for explaining a method for canceling a lock variable in the related art.
Figure 6B:
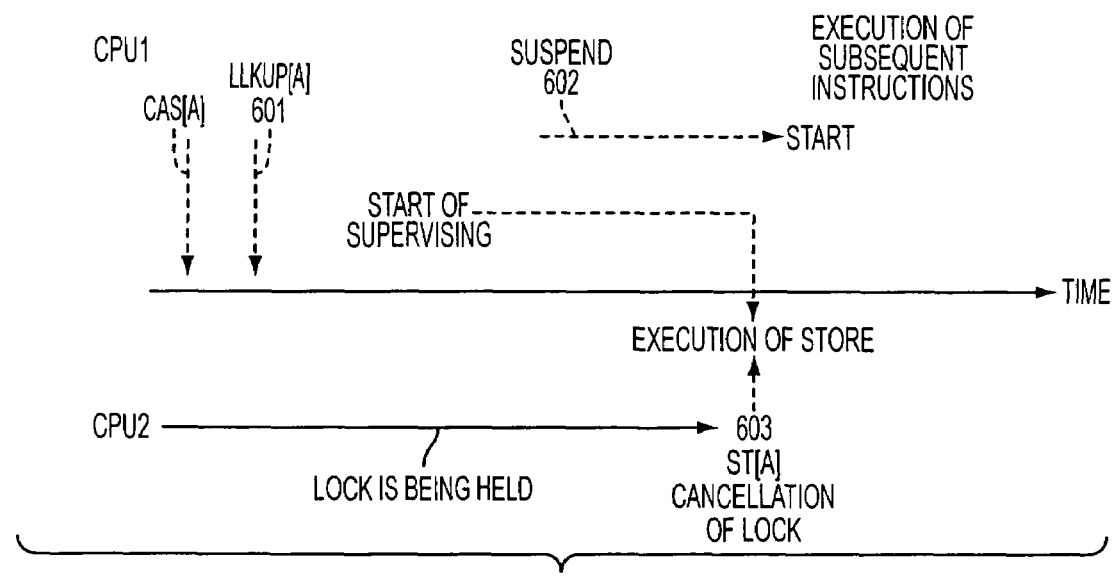
FIG. 6B is a diagram for explaining a method of the technology (1) using the LOAD-WITH-LOOKUP instruction.
Figure 7:
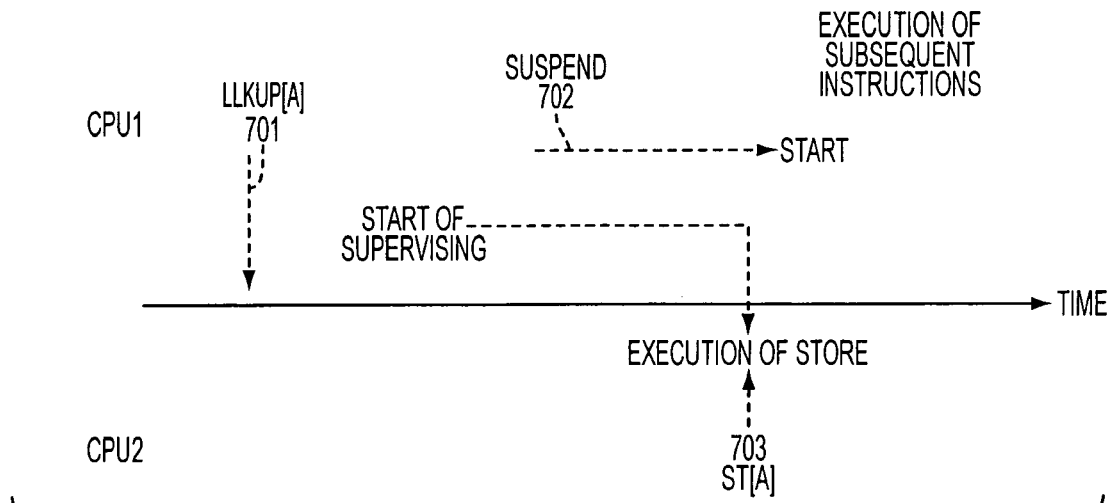
FIG. 7 is a diagram for explaining a method of the technology (2) using the LOAD-WITH-LOOKUP instruction.
Figure 8:
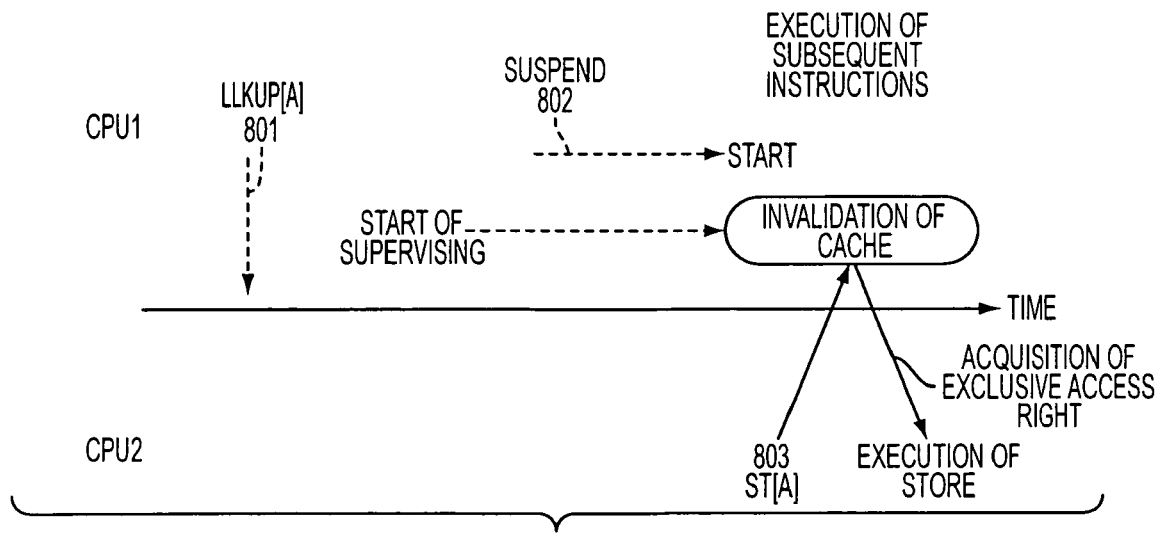
FIG. 8 is a diagram for explaining a method of the technology (3) using the LOAD-WITH-LOOKUP instruction.
Figure 9:
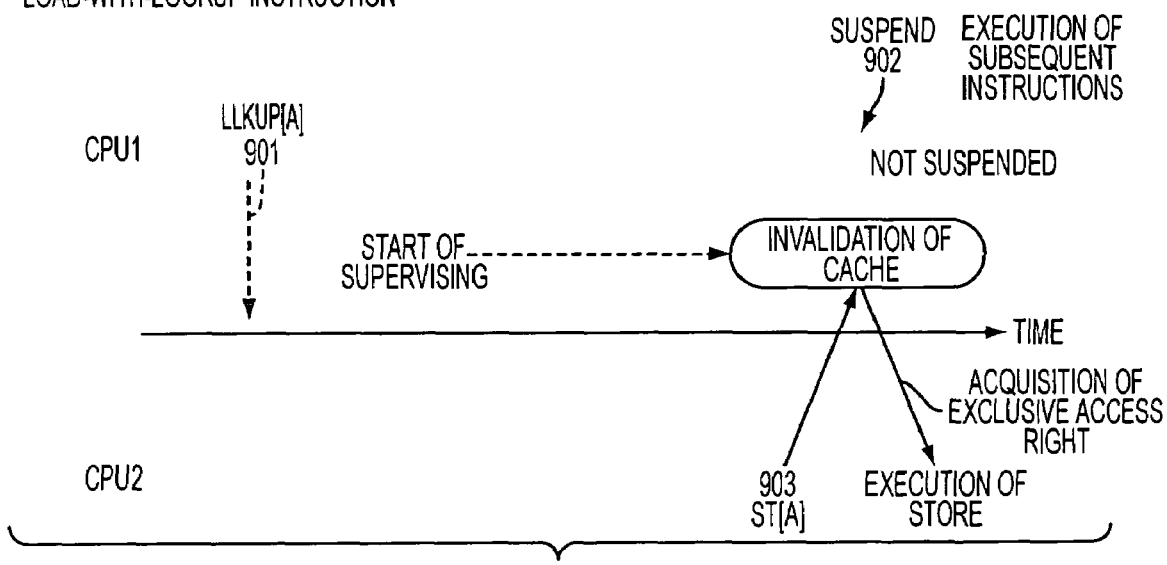
FIG. 9 is a diagram of explaining a method of the technology (4) using the LOAD-WITH-LOOKUP instruction.

Reference will now be made in detail to the present embodiments of the present invention, examples of which are illustrated in the accompanying drawings, wherein like reference numerals refer to the like elements throughout. The embodiments are described below to explain the present invention by referring to the figures.

As described above, the present invention relates to a control apparatus and a control method for effectively switching a plurality of threads, without increase in chip size and power consumption due to the increase of logical amount and physical amount, by considering that a lock is opened by detecting, with an index address and WAY-ID of a cache, update of a relevant supervising object data region, when an instruction for supervising the relevant supervising object data region is executed by another processor and/or thread processor (or any combinations thereof) in a synchronization lock control mechanism of a multithread processor(s) that can execute a plurality of threads.

Figure 10:
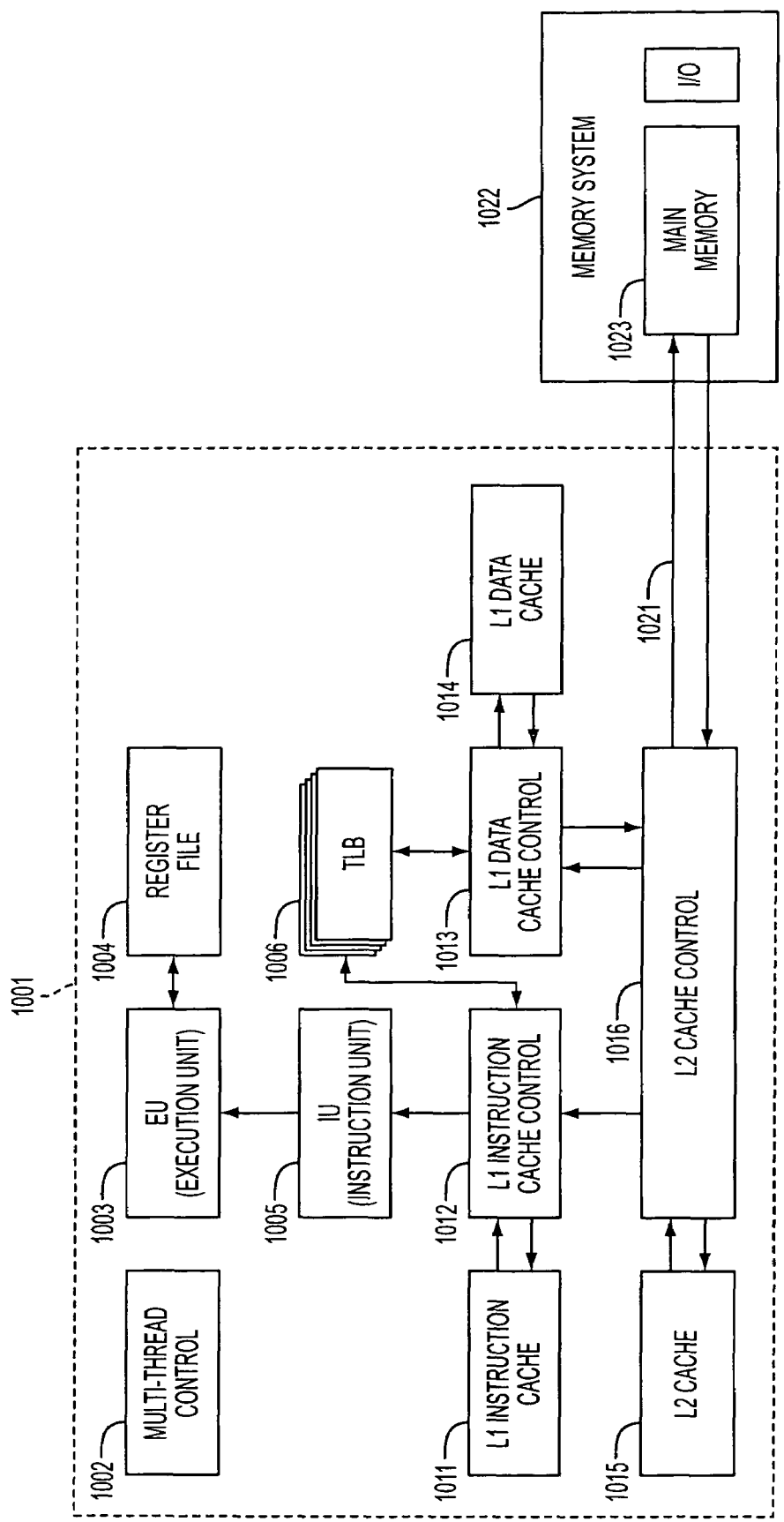
FIG. 10 is a block diagram illustrating a structure of a multithread processor.

FIG. 10 is a block diagram illustrating a structure of a multithread processor in which the present invention is embodied and implemented as the preferred embodiment of the present invention. A CPU (Central Processing Unit) 1001 as a multithread processor as the preferred embodiment of the present invention is constituted, for example, as the multithread processor which can execute in parallel a plurality of threads (programs) with one or more executing units (operation units).

This CPU 1001 is formed, as illustrated in FIG. 10, of a multithread control unit 1002, a register file 1004, an executing unit (operation unit) 1003, an instruction control unit 1005, a TLB (Translation Look-aside Buffer; logical address/ physical address converting unit) 1006, an L1 instruction cache 1011, an L1 data cache 1014, an L2 cache 1015, an L1 instruction cache control unit 1012, an L1 data cache control unit 1013, and an L2 cache control unit 1016. Moreover, the CPU 1001 is connected to a main memory 1023 via a bus 1021 for enabling communication therewith.

The instruction control unit 1005 obtains the instructions from L1 instruction cache 1011, L2 cache 1015, and main memory 1023 and then controls the executing unit 1003 to execute the instructions. Moreover, the L1 data cache control unit 1013 executes management of the scheduled sequence for completion of instructions in the fetch request. In addition, the instruction control unit 1005 executes the push-away control for the store instruction by considering that the store instruction has been completed without waiting for response to the data in the address of the store object.

The TLB (Translation Look-aside Buffer; logical address/physical address converting unit) 1006 is a kind of cache provided for making small the penalty for reference to the page table generated by the conversion into the physical address from the logical address. This TLB stores history of the address to which the reference is made and the converting information to realize high-speed address conversion.

The executing unit (operation unit) 1003 executes various processes (instruction processes) such as arithmetic operations using a register file 1004 or the like. For example, this executing unit functions as an operation unit (executable operation unit) for executing various arithmetic processes.

The main memory 1023 is the memory provided in the external side of the CPU 1001 in order to store various instructions and data. The memory is connected, for making communication, to the CPU 1001 via the bus 1021. When the instructions and data required for process and execution by the executing unit 1003 are not stored in the L1 instruction cache 1011, L1 data cache 1014 and L2 cache 1015 (in other words when a cache miss is generated), the CPU 1001 reads the instructions and data from the main memory 1023 via the bus 1021 or the like.

The L1 instruction cache 1011 is the primary cache for storing the instructions to be executed by the executing unit 1003 and the L1 data cache 1014 is the primary cache for storing various data used for execution of the instructions by the executing unit 1003. The L2 cache 1015 is the secondary cache for storing various instructions and data. Namely, this CPU 1 is hierarchically provided with a plurality of caches (L1 instruction cache 1011, L1 data cache 1014, and L2 cache 1015).

In this embodiment, the L2 cache 1015 provided at the position nearest to the main memory 1023 provided at the external side of the CPU 1001 among a plurality of caches provided to the CPU 1001 is the cache of the lowest hierarchy. To this L2 cache 1015, the L1 instruction cache 1011 and L1 data cache 1014 are caches of the higher hierarchy (host side).

Hereinafter, the thread switching method in the CPU 1001 will be described by paying attention to a cache miss in the L1 data cache 1014 and L2 cache 1015. The L1 data cache 1014 is sometimes called only as the L1 cache and the L1 data cache control unit 1013 is called only as the L1 cache control unit.

The L1 data cache control unit 1013 is provided corresponding to the L1 data cache 1014 for the purpose of management and control of the write and read operations of data to the L1 data cache 1014. Moreover, the L1 instruction cache control unit 1012 is provided corresponding to the L1 instruction cache 1011 for the purpose of management and control of the data write and read operations (instruction data) to the L1 instruction cache 1011. The L2 cache control unit 1016 is provided corresponding to the L2 cache 1015 for the purpose of management and control of write and read of data (instruction data, data) to the L2 cache 1015.

Moreover, the L1 data cache control unit 1013 is provided with a plurality of buffers (L1 MIB: L1 move-in buffers) respectively for temporarily storing the response data to the request issued to the L2 cache 1015 (L2 cache control unit 1016). The L2 cache control unit 1016 is also provided with a plurality of buffers (L2 MIB:L2 move-in buffers) for temporarily storing the response data to the request issued to the main memory 1023 because of the cache miss.

The L2 cache control unit 1016 issues, when the cache miss is generated in the L2 cache 1015, the request to the main memory after acquiring the buffer (L2 MIB: L2 move-in buffer) for storing once the response data to the request issued to the main memory 1023 is received.

The multithread control unit 1002 selectively switches the thread as the processing object by the executing unit 1003. This multithread control unit 1002 controls data transfer between a register (register window) 1004 and the executing unit 1003 on the basis of an identifier (execution thread identifier) for identifying the thread to be executed by the executing unit 1003 (operation unit).

Moreover, the multithread control unit 1002 sets respectively the identifier (thread identifier) for identifying a plurality of threads to be executed in parallel by the CPU 1001 and sets, to each instruction on the threads, the identifier (thread identifier) indicating to which thread the instruction belongs.

For example, the multithread control unit 1002 controls the process to switch the thread, when a cache miss is generated in the instruction to be completed next in execution, on the basis of the instruction identifier and thread identifier notified from the L1 instruction cache control unit 1012 and L1 data cache control unit 1013.

Figure 11:
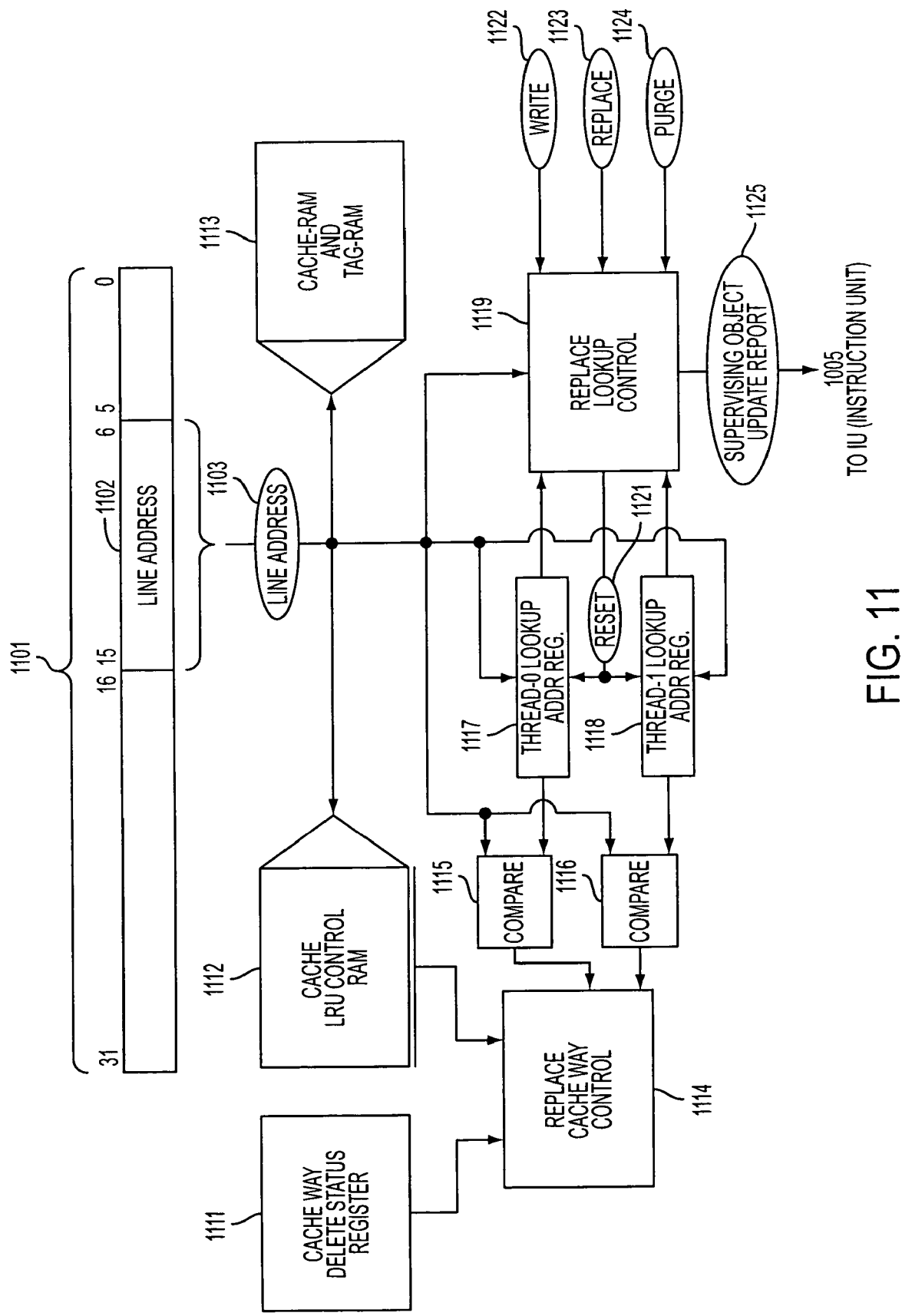
FIG. 11 is a block diagram illustrating a hardware structure of a cache replacement control unit in the multithread processor, according to an embodiment of the present invention.

FIG. 11 illustrates an example of hardware structure of the cache replacement control unit 1100 in the multithread processor 1001, according to an embodiment of the present invention. A cache WAY degeneration (delete) status register 1111 stores the WAY degeneration information of the cache to be used for the replacement control or the like of the cache. A cache LRU control RAM 1112 is used to decide the WAY-ID of the cache of the object of replacement (i.e., cache data to be replaced) with the LRU (Least Recently Used) control of the cache, namely the algorithm for enhancing the priority sequence of the data and the data used recently. A cache RAM and a tag RAM 1113 forms a part of the memory hierarchy. Since the present invention may be applied without relation to the cache hierarchy, description will be made not considering the hierarchy of cache in order to simplify the description. Accordingly, application of the present invention is never influenced by the structure of cache.

An address supervising register 1117 for thread 0 and an address supervising register 1118 for thread 1 is provided to store a cache line address field (hereinafter also referred to as a line address) of a particular address region as the supervising object for each thread. In order to simplify the description, the structure of the multithread processor by two threads for thread 0 and thread 1 is illustrated. However, this structure can also be applied to the CPU of the higher level multithread by expanding the address supervising register.

An address converter 1115 and 1116 detects access to the supervising object address by comparing, at a time of cache access by another thread processor, the line address 1103 with the line address stored in the address supervising register 1117 for thread 0 and the address supervising register 1118 for thread 1. For address comparison, the relevant address comparator compares only the cache line address, and therefore, for example, it is formed of the comparator of the 10-bit width.

A replacement cache WAY control unit 1114 controls replacing a cache WAY on the basis of the cache WAY degeneration information from the cache WAY degeneration status register 1111 and the replacement WAY-ID information from the cache LRU control RAM 1112.

A replacement supervising control unit 1119 supervises update of line address stored in the address supervising register 1117 for thread 0 and address supervising register 1118 for thread 1 in the timing of the WRITE access request 1122, replacement request 1123 and purge request 1124, from another thread processor, and issues, when the update of line address as the supervising object is generated, the report of update 1125 of the supervising object to the object thread of the instruction control unit (refer to instruction control unit 1005 of FIG. 10) and also issues the reset 1121 to the address supervising register 1117 for thread 0 and the address supervising register 1118 for thread 1.

Of a virtual address or physical address 1101 used for memory access, the cache line addresses 1102 and 1103 are used for the cache access to the cache RAM, tag RAM 1113 and cache LRU control RAM 1112.

Figure 19:
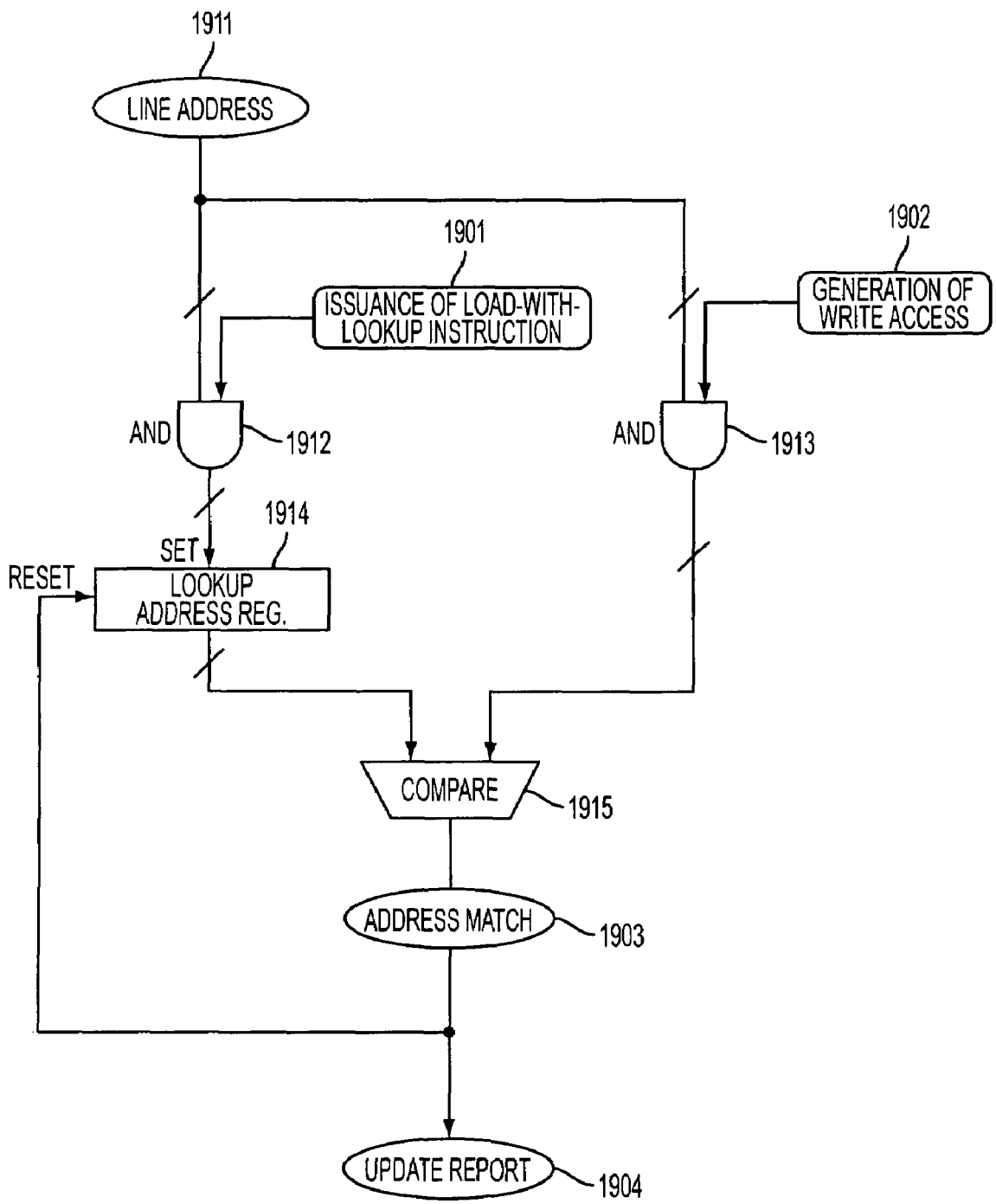
FIG. 19 is a diagram illustrating a structure of a supervising register control circuit, according to an embodiment of the present invention.

FIG. 19 illustrates an example of the hardware structure of the update supervising control unit 1119 (refer to the update supervising control unit 1119 of FIG. 11) in the cache replacement control unit 1100, according to an embodiment of the present invention. In FIG. 19, the line address 1911 when the cache access is generated (refer to the line address 1103 of FIG. 11), is registered as the supervising object to the address supervising register 1914 by the AND logic gate 1912 in the timing of the address supervising request to the particular address region by issuance of the LOAD-WITH-LOOKUP instruction 1901.

Moreover, when the WRITE access 1902 is generated to the cache by another thread processor, an output of the address supervising register 1914 to which the line address as the supervising object is set by the AND logic gate 1913 is compared with the line address of the relevant WRITE access in the line address comparator 1915. For example, the relevant address comparator is formed only of a comparator having 10-bit width comparison of cache line addresses. Moreover, in unlimiting examples, a relevant WRITE access 1902 can also include a store request from another thread of own CPU, a move-out request from other CPUs and invalidation request(s).

When matching of address 1903 is detected by the address comparator 1915, update of address as the supervising object is reported as the update report 1904 (1125 in FIG. 11) to the object thread of the instruction control unit (refer to the instruction control unit 1005 of FIG. 10).

Figure 12:
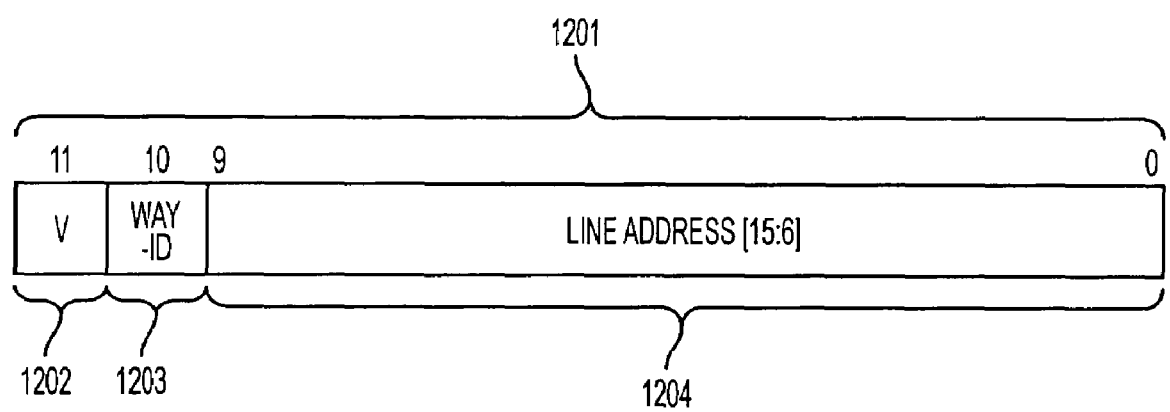
FIG. 12 is a diagram illustrating a structure of a supervising register as an embodiment of the present invention.

FIG. 12 illustrates an example of the structure of the address supervising register 1914 in the present invention. The address supervising register 1201 (1914 in FIG. 19, address supervising registers 1117 and 1118 in FIG. 10, and lookup address register 2024 in FIG. 20) is formed of a VALID flag 1202, a WAY-ID field 120, and a cache line address field 1204. The VALID flag 1202 indicates the information about validity/invalidity of the information stored in the address supervising register in order to prevent that the invalid line address is considered as the supervising object. The WAY-ID field designates the cache region divided into a plurality of regions. The cache line address 1204 stores the cache line addresses, used for cache access to the cache RAM, tag RAM 1113 and cache LRU control RAM 1112, and each cache line address is indicated by a number of bits from among the number of bits in virtual addresses or physical addresses 1101 (see FIG. 11) used for memory access.

Figure 13:
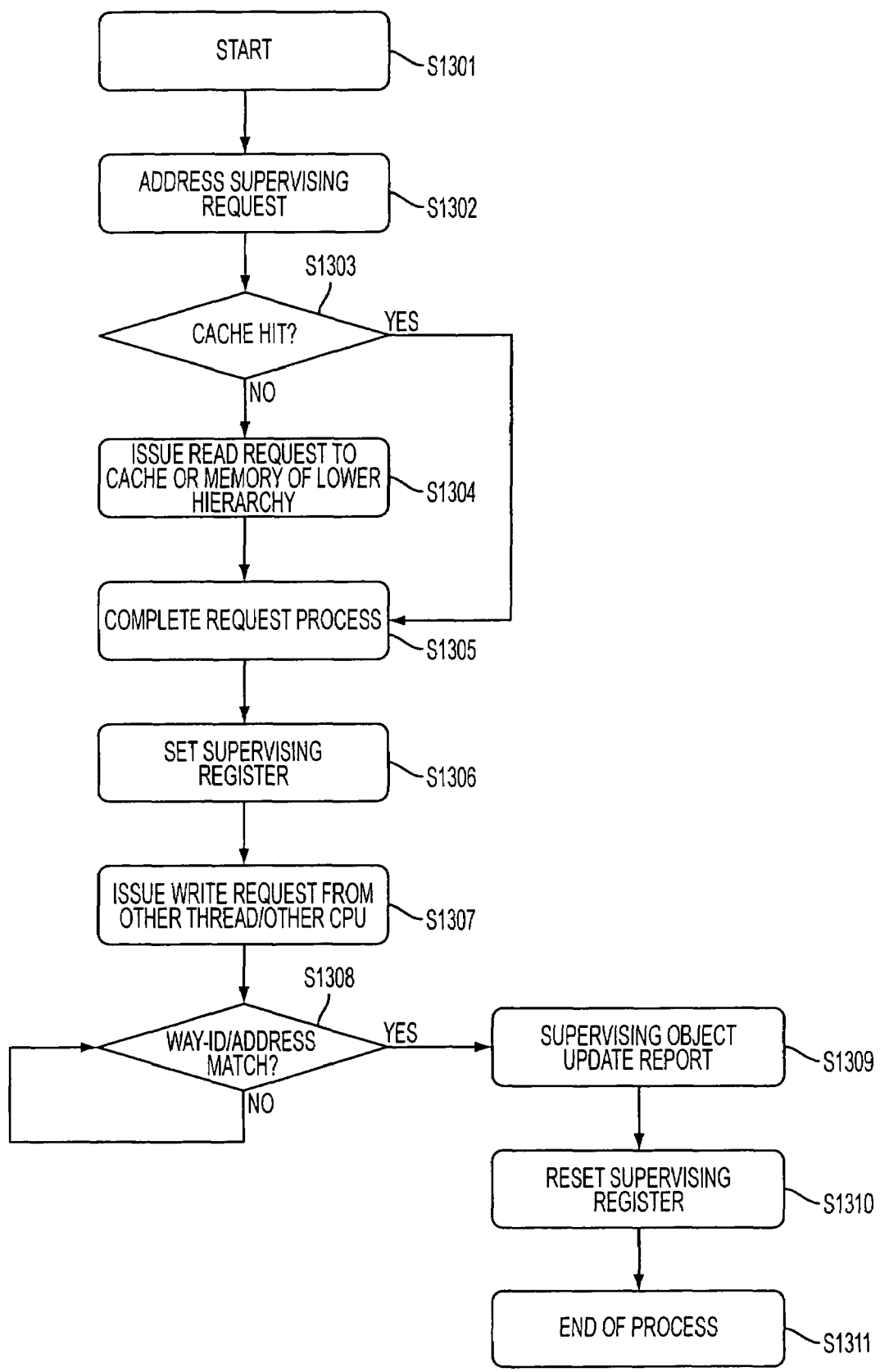
FIG. 13 is a flowchart showing a method of controlling update of a supervising object block as an embodiment of the present invention.

FIG. 13 is a flowchart showing a method of controlling update of the supervising object block, according to an embodiment of the present invention. The processing sequence of FIG. 13 will be explained below. The process of supervising a particular address region via a LOAD-WITH-LOOKUP instruction or the like, according to the present invention, starts at operation 1301. First, the address supervising request to the particular address region by issuance of the LOAD-WITH-LOOKUP instruction or the like is executed (step S1302).

Next, at step 1303, whether the cache is hit or not is judged by searching the cache (refer to the cache RAM and tag RAM 1113 of FIG. 11) with the line address (line address 1103 of FIG. 11) for the relevant address supervising request. When the cache is hit, the process goes to the request process completion step (step S1305). When the cache is not hit, at step 1304, the READ request is issued to the less significant cache. If the less significant cache is not hit, the READ request is then issued to the still further less significant cache. If any cache in any hierarchy is not hit finally, the process goes to the request process completion step (step S1305) by issuing the READ request to the memory.

In the supervising register setting step (step S1306), the VALID flag (refer to the VALID flag 1202 of FIG. 12), WAY-ID (refer to the WAY-ID field 1203 of FIG. 12) and line address (refer to the line address field 1204 of FIG. 12) are set to the address supervising registers of each thread (refer to the address supervising register 1117 for thread 0 and address supervising register 1118 for thread 1 of FIG. 11) and supervising of the WAY-ID and line address when, for example, the WRITE access is generated is started. The relevant WRITE access can include a store request from another thread of own CPU, a move-out request from other CPUs, and invalidation request(s).

When, for example, the WRITE access from another thread/another CPU is generated (step S1307), the update supervising control unit 1119 (refer to the update supervising control unit 1119 of FIG. 11) supervises the WAY-ID and line address corresponding to all thread numbers in the WAY-ID and line address supervising step (step S1308). When, at 1308, the WRITE access address value matches with a value of any address supervising register (refer to the address supervising register 1117 for thread 0 and address supervising register 1118 for thread 1 of FIG. 11), update of the address as the supervising object is notified, in the update object update report step (step S1309), with the supervising object update report 1125 to the object thread of the instruction control unit (refer to the instruction control unit 1005 of FIG. 10).

Moreover, when the update of the address as the supervising object is reported, the address supervising register for the corresponding thread (address supervising register 1117 for thread 0 and address supervising register 1118 for thread 1 of FIG. 11) is reset 1121 in the update register reset step (step S1310). As the method for resetting the address supervising register, according to an aspect of the present invention, a method for failing or invalidating the VALID flag (refer to the VALID flag 1202 of FIG. 12) to 0 may be considered. The process of supervising a particular address region via a LOAD-WITH-LOOKUP instruction or the like, according to the present invention, is completed at operation 1311.

Moreover, at step 1308, if the WRITE access address value is not matched with a value of the corresponding address supervising register for thread (refer to the address supervising register 1117 for thread 0 and the address supervising register 1118 for thread 0 of FIG. 11), any process is not executed until the next WRITE access is generated (step S1308).

Figure 14:
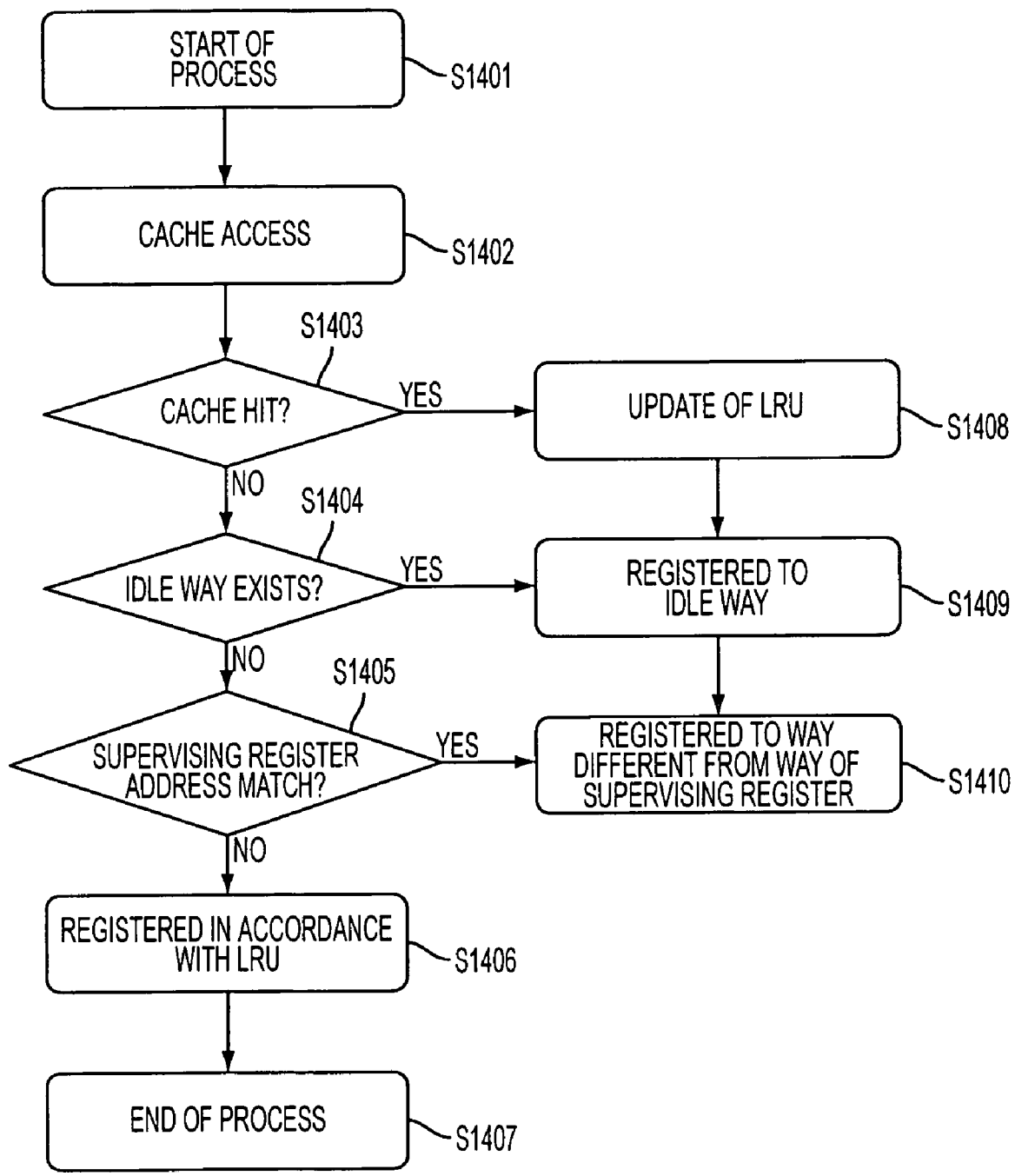
FIG. 14 is a flowchart showing a method of resetting the supervising object block from the replacement object as an embodiment of the present invention.

FIG. 14 is a flowchart illustrating a method of controlling update of the supervising object block, according to an embodiment of the present invention. The process sequence of FIG. 14 will be described below, with the start of the process at operation 1401. First, when a cache access is generated (step S1402) and a cache is hit, the replacement cache WAY control unit (refer to the replacement cache WAY control unit 1114 of FIG. 11) updates the cache LRU (refer to the cache LRU control RAM 1112 of FIG. 11) (step S1408).

Moreover, when a cache miss is generated, an idle cache WAY can be searched on the basis of the registration information of the LRU (refer to the cache LRU control RAM 1112 of FIG. 11) (step S1404). When the idle cache WAY is detected, the replacement cache WAY control unit (refer to the replacement cache WAY control unit 1114 of FIG. 11) executes registration to the idle cache WAY and also executes update of the LRU (step S1409), thereby registering the missed cache data as fetched in the idle cache WAY and updating the cache LRU control RAM 1112.

Moreover, if, at operation 1404, there is not an idle cache WAY, at operation 1405, the line address is compared with that of the corresponding address supervising register for a thread (refer to the address supervising register 1117 for thread 0 and the address supervising register 1118 for thread 1 of FIG. 11). When, at operation 1405, the line address is matched, a registration of the missed cache data in the cache 1113 is made to a WAY that is different from a WAY matching the address supervising register and the LRU is also updated (step S1410). Accordingly, even when the line address is matched with that of the supervising object block, it can be prevented that the relevant supervising object block is replaced by becoming the replacement object.

When, at operation 1405, the line addresses are not matched, registration of the missed cache data in the cache 1113 is made in accordance with the LRU (refer to the cache LRU control RAM 1112 of FIG. 11) (step S1406). In this case, the oldest cache line is replaced. At operation 1407, the process of controlling update of the supervising object block is completed.

Figure 15:
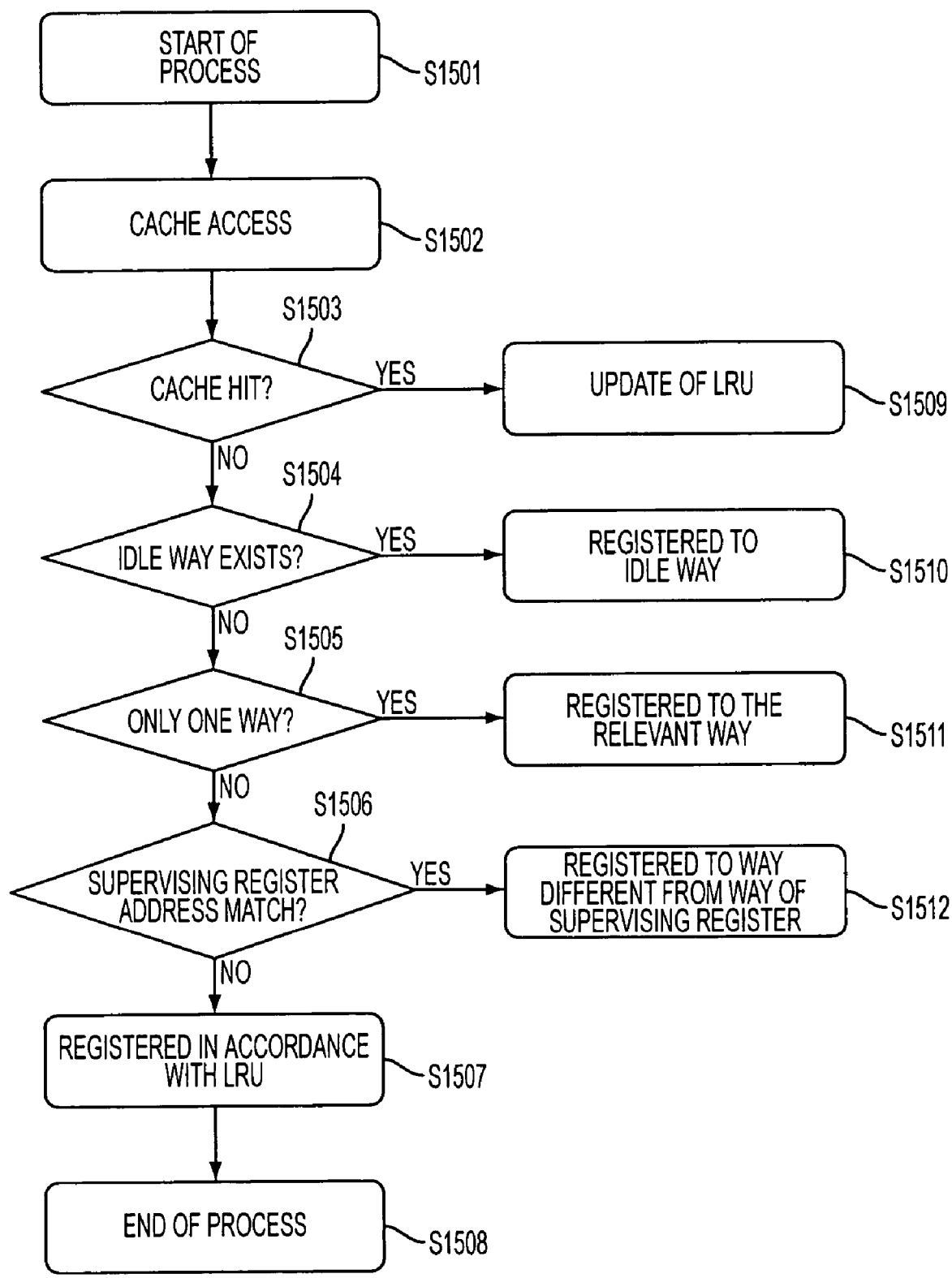
FIG. 15 is a flowchart showing a method of setting the supervising object block when one WAY is operated to the replacement object as an embodiment of the present invention.
Figure 16:
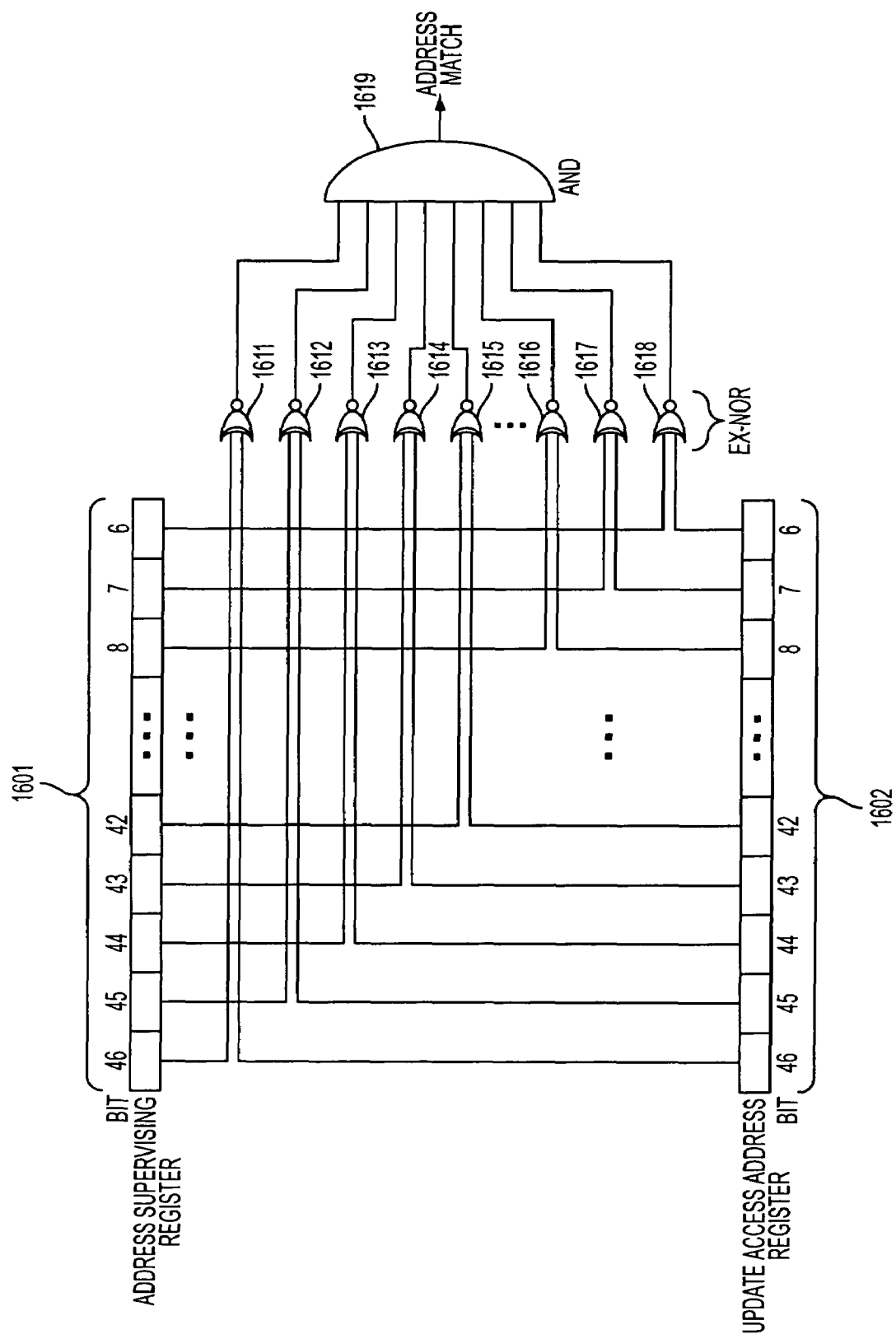
FIG. 16 is a diagram illustrating a structure of an address comparator as the related art.
Figure 17:
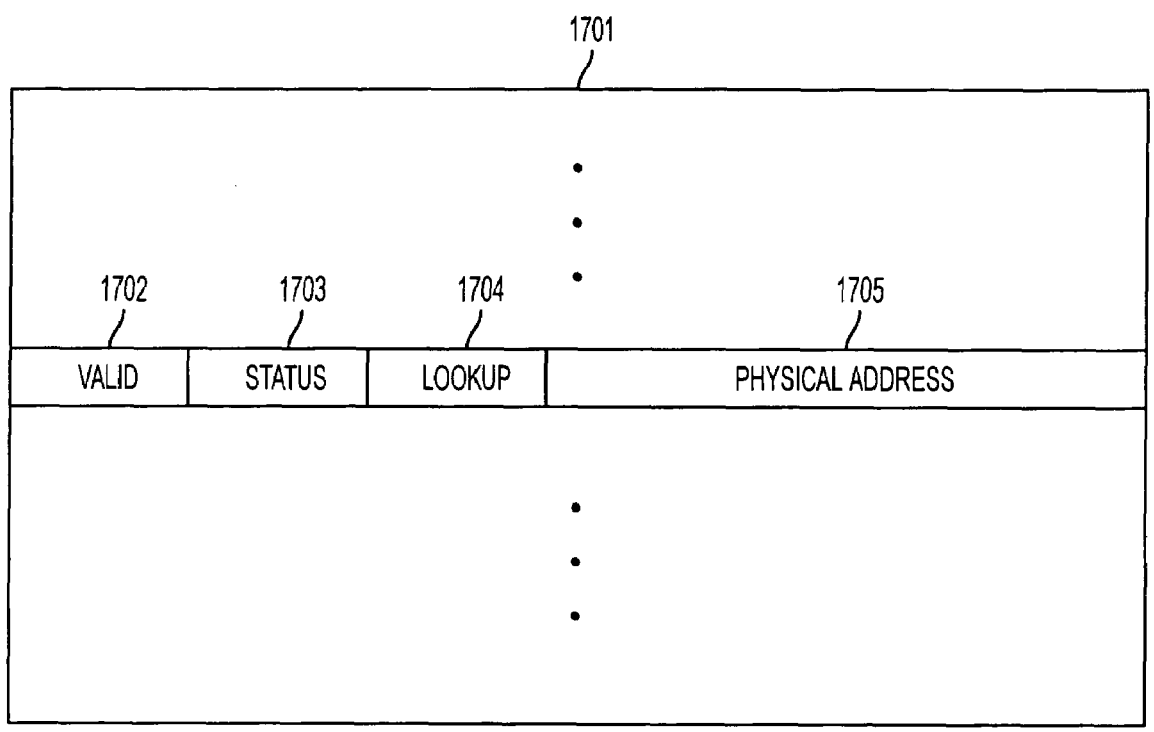
FIG. 17 is a diagram illustrating a structure of RAM for storing a supervising flag as the related art.
Figure 18:
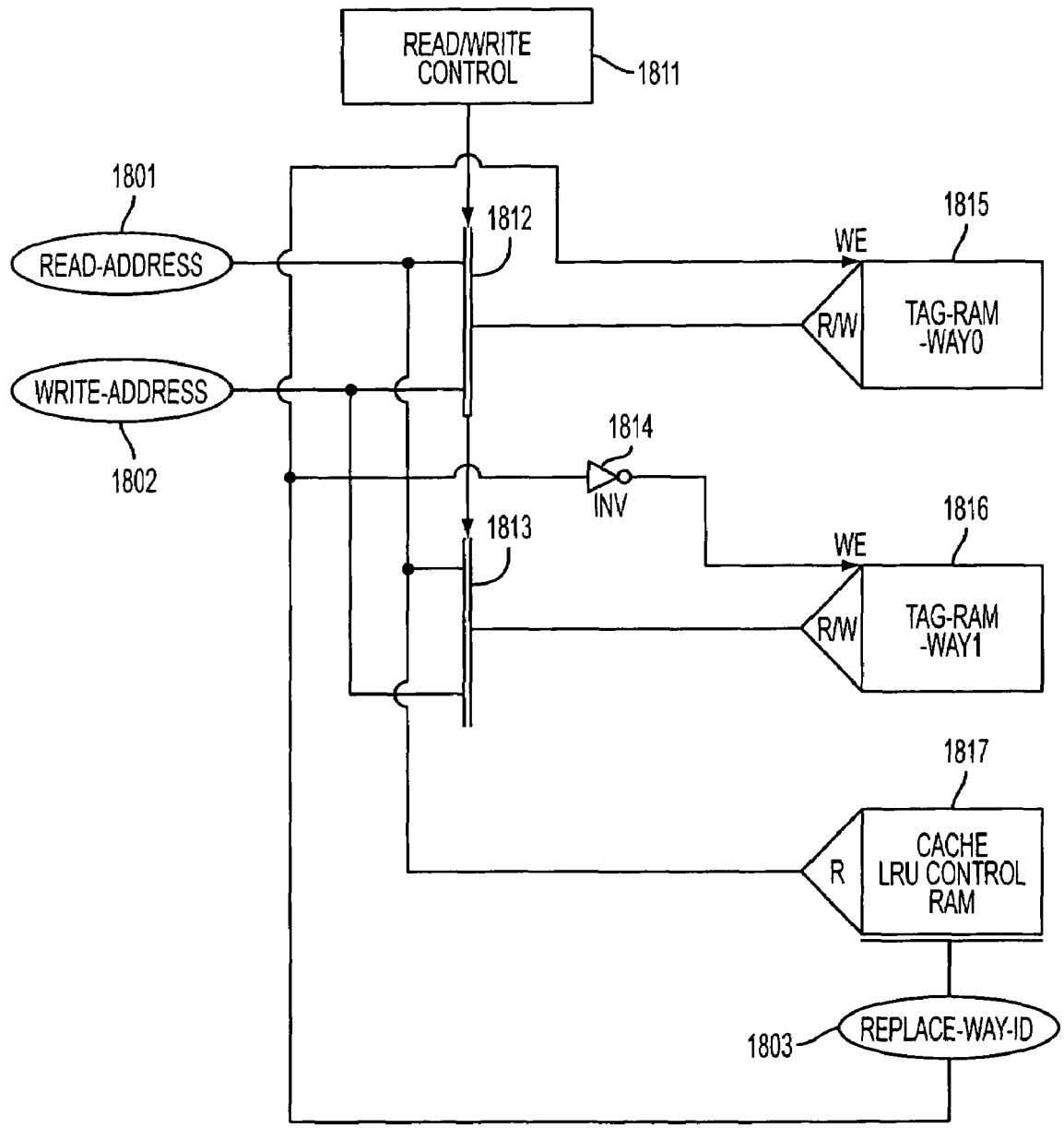
FIG. 18 is a diagram illustrating a structure of a write WAY deciding control circuit as the related art.

FIG. 15 is a flowchart illustrating a method for setting, as the replacement object, the supervising object block when the WAY operation is carried out, according to an embodiment of the present invention. In the method for controlling update of the supervising object block described in regard to FIG. 14, when the cache WAY becomes only one WAY by the degeneration (deletion) of cache, the relevant cache access is sometimes not registered to the cache 1113 so that the supervising object block is not replaced (i.e., operation 1410). In this case, since operations could sometimes hang, according to another aspect of the present invention, it is sometimes forcibly requested to execute the replacement of the relevant supervising object block due to the cache access.

The process sequence of FIG. 15 will be described below, which starts at operation 1501. First, when a cache access is generated and a cache is hit (step S1502), the replacement cache WAY control unit (refer to the replacement cache WAY control unit 1114 of FIG. 11) updates as usual the LRU (refer to the cache LRU control RAM 1112 of FIG. 11) (step S1509).

Moreover, when a cache miss is generated, the idle cache WAY can be searched on the basis of the registration information of the LRU (refer to the cache LRU control RAM 1112 of FIG. 11) (step S1504). When the idle cache WAY is detected, the replacement cache WAY control unit (refer to the replacement cache WAY control unit 1114 of FIG. 11) executes registration to the idle cache WAY and the LRU is also updated (step S1510), thereby registering the missed cache data when fetched in the idle cache WAY and updating the cache LRU control RAM 1112.

Moreover, when an idle WAY is not detected, the cache WAY that is not degenerated (deleted) is searched on the basis of the cache WAY degeneration information of the cache WAY degeneration status register (refer to the cache WAY degeneration status register 1111 of FIG. 11) (step S1505). When the cache WAY is only one way, replacement is executed by registering the relevant missed cache access when fetched to the relevant supervising object block in the cache 1113 (step 1511). Accordingly, even when the cache is operating only in one WAY, due to a degeneration of the cache, a replacement registration can forcibly be made to the cache 1113.

However, when two or more cache WAYs that are not degenerated are detected, the line address is compared with that of the corresponding address supervising register for thread (refer to the address supervising register 1117 for thread 0 and the address supervising register 1118 for thread 1 of FIG. 11) (step S1506). When, at operation 1506, the line addresses are matched, a registration of the missed cache data in the cache 1113 is made to a WAY that is different from a WAY matching the address supervising register and the LRU is also updated (step S1512). Accordingly, even when the line address is matched with that of the supervising object block, it can be prevented that the relevant supervising object block is replaced by becoming the replacement object (i.e., preventing the supervising object block from being replaced with the missed cache data when fetched).

When, at operation 1506, the line addresses are not matched, registration is carried out in accordance with the LRU (refer to the cache LRU control RAM 1112 of FIG. 11) (step 1507). In this case, the oldest cache line is replaced. At operation 1508, the process of setting, as the replacement object, the supervising object block when the WAY operation is carried out is completed.

Figure 20:
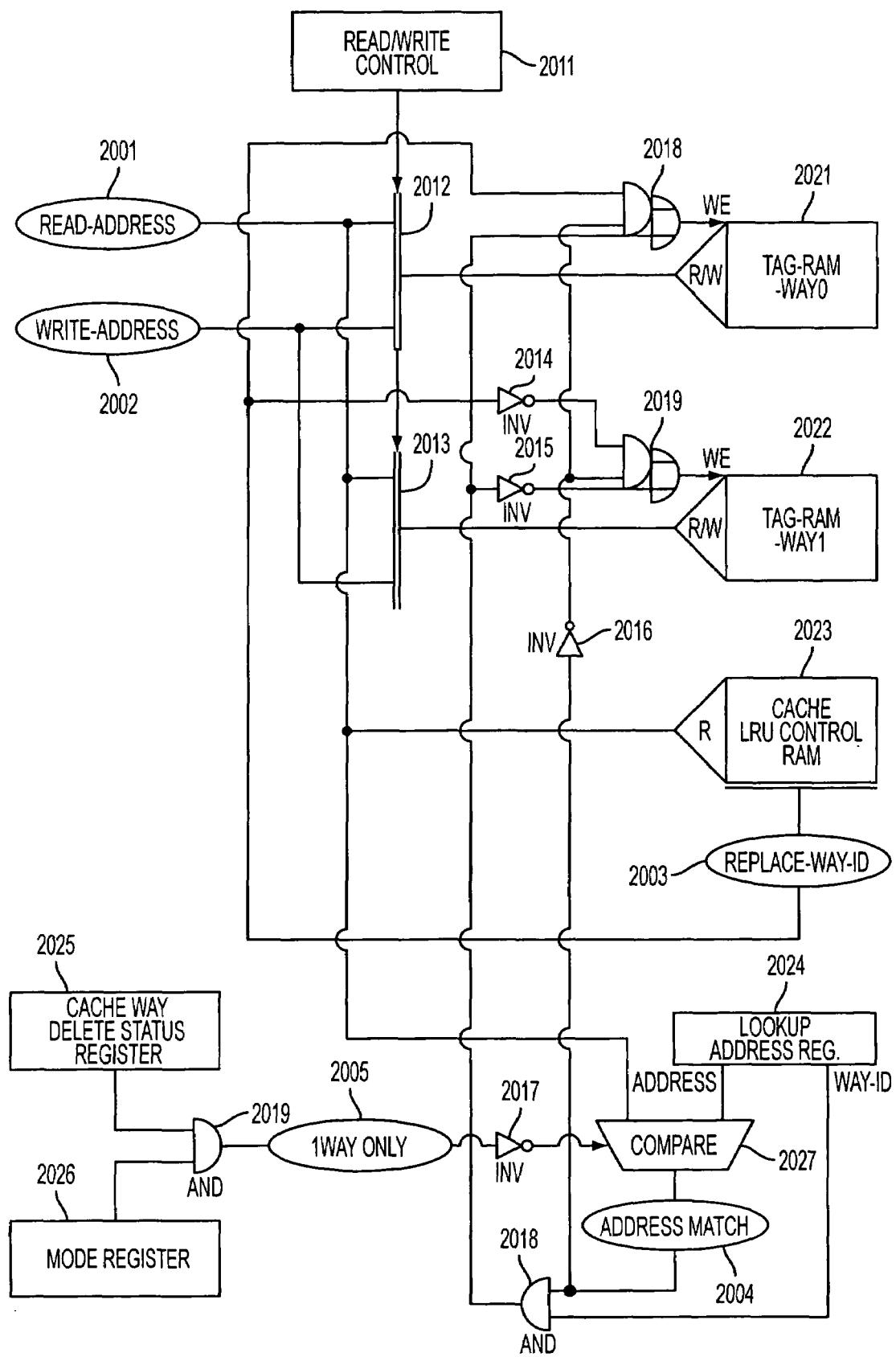
FIG. 20 is a diagram illustrating a structure of the write WAY deciding control circuit which may or may not replace the supervising object, according to an embodiment of the present invention.

FIG. 20 illustrates a structure of a write WAY deciding control circuit which does not carry out the replacement of the supervising object, according to an embodiment of the present invention. FIG. 20 corresponds to the flowchart of FIG. 14 showing the method of controlling update of the supervising object block and the flowchart of FIG. 15 showing the method of setting the supervising object block to the replacement object when one WAY is operated.

The READ/WRITE control unit 2011 judges whether the relevant cache access is the READ access or WRITE access when the cache access is generated and controls the select signal of the multiplexers 2012 and 2013. For example, when the relevant cache access is the READ access, the select signal is controlled to control the multiplexers 2012 and 2013 to output the READ address 2001. When the cache access is the WRITE access, the select signal is controlled to control the multiplexers 2012 and 2013 to output the WRITE address 2002.

The tag RAM 2021 for WAY 0 and the tag RAM 2022 for WAY 1 are respectively provided with the write enable (WE) terminal and executes the WRITE operation to the RAM when 1 is input to the relevant write enable terminal.

The cache LRU control RAM 2023 corresponds to the cache LRU control RAM 1112 of FIG. 11. This RAM is used for the LRU (Least Recently Used) control of cache and outputs the replacement WAY-ID 2003 based on the LRU information. The inverter logic gates 2014, 2015, 2016, 2017 are logic gates for outputting negation of input. Moreover, the 3-input AND-OR logic gates 2018 and 2019 output the result of the logical product of the signals input to the AND logic gates and the logical sum of the signals input to the OR logic gate. Moreover, the AND logic gates 2018 and 2019 output the logical product of the input signals.

The address supervising register (Lookup Address Register) 2024 corresponds to the address supervising register 1117 for thread 0 and the address supervising register 1118 for thread 1 of FIG. 11 (here, the address supervising register for each thread is omitted to simplify the description). The address comparator 2027 compares the line address stored in the address supervising register 2024 with the READ address 2001 of the read access.

The cache WAY degeneration status register 2025 corresponds to the cache WAY degeneration status register 1111 of FIG. 11 and stores the WAY degeneration information of the cache used for replacement control or the like of the cache. Moreover, a mode setting register 2026 can select the operations in the flowchart illustrating the method for controlling update of the supervising object block of FIG. 14 and the operations in the flowchart of FIG. 15 illustrating the method for forcible replacement of the supervising object block when there is only one idle cache WAY that can be replaced.

In the related art, when the READ access 2001 as the cache access is generated, the READ/WRITE control unit 2011 selectively controls the multiplexers 2012 and 2013, searches the relevant line address of the tag RAM 2021 for WAY 0 and the tag RAM 2022 for WAY 1, and also searches the cache LRU control RAM 2023.

If a cache miss is generated in the result of search for the tag RAM 2021 for WAY 0 and the tag RAM 2022 for WAY 1, the line address of the address supervising register 2024 is compared with the READ address 2002 with the address comparator 2027. When address match 2004 is not detected, the missed cache data as fetched is registered to the idle WAY in accordance with the replacement WAY-ID 2003 on the basis of the LRU information of the cache LRU control RAM 2023.

Moreover, during generation of the cache miss and when address match 2004 is detected, missed cache data as fetched is registered in the cache 1113 by replacement of the relevant line address of the tag RAM for WAY 0 or WAY 1 on the basis of the WAY-ID stored in the address supervising register 2024. Moreover, during generation of the cache miss and when the address match 2004 is not detected, the missed cache data as fetched is registered by replacement of the relevant line address of the tag RAM for WAY 0 or WAY 1 in accordance with the replacement WAY-ID 2003 on the basis of the LRU information of the cache LRU control RAM 2023.

Here, when it is detected that only one way exists as the cache WAY from the information of the cache WAY degeneration status register 2025 (refer to the cache WAY degeneration status register 1111 of FIG. 11), address comparison in the address comparator 2027 can be selectively disabled, for example, according to the cache way delete status register and/or the mode register 2026. Accordingly, when only one WAY exists as the cache WAY, replacement of the supervising object block is never suppressed.

Moreover, for example, since the relevant cache WAY degeneration status register 2025 can disable an output with the mode setting register 2026, it can select the operations of the flowchart of FIG. 14 showing the method for controlling update of the supervising object block and the operations of flowchart of FIG. 15 showing the method for setting the supervising object block when only one WAY is operated as the replacement object.

The preferred embodiment of the present invention has been described in detail with reference to the accompanying drawings. However, the practical structure of the present invention is not limited to and allows various changes and modifications of design within the scope of the subject matter thereof. Therefore, although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A processor comprising a plurality of thread processors and a cache memory having a plurality of WAY, comprising:
   a supervising address register provided for each thread processor to hold a cache WAY number and a cache line address to designate a particular block of the cache memory, and
   a comparator provided for each thread processor to compare a cache WAY number and a line address of a cache memory held by a supervising address register with a cache WAY number and line address of a cache memory accessed from another thread processor.

2. The processor of claim 1, wherein said supervising address register is reset when an update of the particular memory block is detected according to output of the comparator.

3. A processor comprising a plurality of thread processors and a cache memory having a plurality of WAY, comprising:
   a supervising address register provided for each thread processor to hold a cache WAY number and a cache line address to designate a particular block of the cache memory, and
   a comparator provided for each thread processor to compare a cache WAY number and a line address of a cache memory held by a supervising address register with a cache WAY number and line address of a cache memory accessed from another thread processor, to execute an exclusive access control of the thread processor based upon an output from the comparator.

4. An information apparatus, comprising:
   a main memory, and
   a processor comprising a plurality of thread processors and a cache memory having a plurality of WAY, each of the processor comprising:
      a supervising address register provided for each thread processor to hold a cache WAY number and a line address to designate a particular block of the cache memory, and
      a comparator provided for each thread processor to compare the cache WAY number and the line address of the cache memory held by the supervising address register with a cache WAY number and a line address of a cache memory accessed from another thread processor, to execute an exclusive access control of the thread processor to the cache memory or to the main memory based upon an output of the comparator.

5. A processor comprising a cache memory having a plurality of WAY and a plurality of thread processors, comprising:
   a supervising address register provided for each thread processor to hold a cache WAY number and a line address for designating a particular block of the memory; and
   a comparator provided for each thread processor to compare a cache WAY number and a line address of a cache memory held by a supervising address register with a cache WAY number and a line address of a cache memory access from the other thread processor, to register a cache block to a WAY having a number different from the WAY held by the supervising address register when a cache miss occur, which is to be replaced with the particular block designated in the supervising address register.

6. An information apparatus, comprising:
a main memory, and
a processor including a cache memory having a plurality of WAY and a plurality of thread processors, the processor comprising:
   a supervising address register provided for each thread processor to hold a cache WAY number and a line address for designating a particular block of the cache memory,
   a comparator provided for each thread processor to compare the cache WAY number and the line address of the cache memory held by the supervising address register with a cache WAY number and a line address of a cache memory accessed from the other thread processor, to execute an exclusive access control of the thread processor to the cache memory or to the main memory based upon an output of the comparator.

7. The processor of claim 6, wherein when the cache memory is degenerated to one WAY, said cache block to be replaced with the particular block is registered to the WAY of degenerated cache memory.

8. A method of controlling a cache memory in a processor comprising a plurality of thread processors and a cache memory including a plurality of WAY, the method comprising:
   storing a supervisory cache WAY number and a line address for designating a particular block of the cache memory;
   comparing the supervisory cache WAY number and the line address with a relevant write request access to the cache when a write request access to the cache memory is issued by one of the thread processors, and if the comparing results in a match, detecting an update of the particular block designated by the supervisory cache WAY number and the line address.

9. The method of controlling a cache memory of claim 8, when a read access to the cache memory is generated by one of the thread processors, holding the supervisory cache WAY number and the line address after completion of the read access.

10. The method of controlling a cache memory of claim 8, further comprising resetting the supervisory cache WAY number and the line address when updating of the particular block is detected.

11. A method of controlling a cache memory in a processor comprising a cache memory having a plurality of WAY and a plurality of processors, the method comprising:
   storing a supervisory cache WAY number and a line address for designating a particular block of the cache memory;
   comparing the supervisory cache WAY number and the line address of the particular block of the cache memory with a cache WAY number and a line address of a cache memory block accessed from a thread processor,
   registering the cache memory block to be replaced with the particular block designated by the supervisory cache WAY number and the line address if the comparing shows that the cache memory block has the cache WAY number different from the supervisory cache WAY number, when a cache miss for the cache memory block occurred.

12. The method of controlling the cache memory of claim 11, wherein when said cache memory is degenerated to one WAY, said cache memory block to be replaced with said particular block designated by the supervisory cache WAY number and the line address due to an occurrence of the cache miss, is forcibly registered to the supervisory cache WAY number.

13. A processor comprising a cache memory having a plurality of WAY and a plurality of thread processors, the processor comprising:
   a cache memory having a plurality of WAY and
   a supervisor supervising a cache line address used for an index of the cache memory and a WAY-ID of the cache memory that designates a supervised block of the cache memory for each thread processor and detecting an update of a relevant supervised block of the cache memory according to the index cache line address and the WAY-ID, when an instruction for supervising the relevant supervised block of the cache memory is executed by the other processor and/or thread processor while one or more thread processors is or are executing the plurality of threads.

14. The processor of claim 13, wherein the supervisor comprises a plurality of supervising address respectively corresponding to each thread processor to store the index cache line address and the WAY-ID.

15. The processor of claim 14, wherein each supervising address register comprises a valid flag field, a WAY-ID field, a cache line address field.

16. The processor of claim 15, wherein the cache line address field is 10 bits.

17. The processor of claim 13, wherein the supervisor comprises a plurality of comparators corresponding to each thread processor and according to each supervisory WAY-ID comparing an index cache line address of a relevant thread processor with a cache line address of a cache memory accessed from another thread processor, to execute an exclusive access control of the relevant thread processor based upon an output from each comparator.

18. The processor of claim 13, wherein the supervisor registers a cache block, which is to be replaced with a relevant supervised block of the cache memory due to an occurrence of a cache miss, to a WAY having a number different from the WAY of the relevant supervised block of the cache memory.

19. The processor of claim 18, wherein when the cache memory is degenerated to one WAY, the supervisor forcibly registers said cache block, which is to be replaced with a relevant supervised block of the cache memory due to occurrence of a cache miss, to the WAY of the relevant supervised block of the cache memory.

20. The processor of claim 13, wherein the supervisor selects a method of detecting the update of a relevant supervised block of the cache memory.

21. A cache replacement controller provided for a processor comprising a plurality of thread processors, the controller comprising:
   a supervisor supervising, for each executing thread processor, a cache line address used for an index of a cache and a WAY-ID of the cache that designate a supervised block of main memory for each thread processor and detecting an update of a relevant supervised block of the main memory according to the index cache line address and the WAY-ID, when an instruction for supervising the relevant supervised block of the main memory is executed by the other processor and/or thread processor while one or more processors is or are executing the plurality of threads.

* * * * *

UNITED STATES PATENT AND TRADEMARK OFFICE
CERTIFICATE OF CORRECTION

| | |
|---|---|
| PATENT NO. | : 7,437,519 B2 |
| APPLICATION NO. | : 11/283832 |
| DATED | : October 14, 2008 |
| INVENTOR(S) | : Naohiro Kiyota et al. |

It is certified that error appears in the above-identified patent and that said Letters Patent is hereby corrected as shown below:

Column 20, Line 22, after "supervising address" insert --registers--.

Signed and Sealed this

Seventeenth Day of February, 2009

JOHN DOLL
*Acting Director of the United States Patent and Trademark Office*